United States Patent
Matsumura

(10) Patent No.: US 9,471,992 B2
(45) Date of Patent: Oct. 18, 2016

(54) MOVING IMAGE PROCESSING APPARATUS, MOVING IMAGE PROCESSING METHOD, AND COMPUTER PRODUCT

(71) Applicant: FUJITSU LIMITED, Kawasaki-shi, Kanagawa (JP)

(72) Inventor: Hidetoshi Matsumura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 14/181,872

(22) Filed: Feb. 17, 2014

(65) Prior Publication Data
US 2014/0270538 A1 Sep. 18, 2014

(30) Foreign Application Priority Data

Mar. 18, 2013 (JP) .................................. 2013-055687

(51) Int. Cl.
G06K 9/48 (2006.01)
G06T 7/20 (2006.01)
H04N 19/53 (2014.01)

(52) U.S. Cl.
CPC ................. *G06T 7/20* (2013.01); *H04N 19/53* (2014.11)

(58) Field of Classification Search
CPC ........ H04N 19/53; H04N 19/51; G06T 7/20; G06T 7/2013; G06T 7/2026
USPC ................... 382/107, 199; 348/208.6, 416.1, 348/231.99, 699; 375/240.14, 240.16
See application file for complete search history.

(56) References Cited

U.S. PATENT DOCUMENTS 5,576,772 A * 11/1996 Kondo .................. G06T 7/2026
348/699
5,635,982 A * 6/1997 Zhang ............... G06F 17/30802
348/231.99

(Continued)

FOREIGN PATENT DOCUMENTS

JP 10-271514 10/1998
JP 11-298904 10/1999

(Continued)

OTHER PUBLICATIONS

JPOA—Office Action of Japanese Patent Application No. 2013-055687, dated Aug. 30, 2016, with English Translation of the relevant part, p. 1, line 22 to p. 2, line 20 & p. 2, line 23 to line 27 & p. 2, line 30 to line 33 & p. 2, line 36 to p. 3, line 7 of the Office Action.

*Primary Examiner* — Mekonen Bekele
(74) *Attorney, Agent, or Firm* — Fujitsu Patent Center

(57) ABSTRACT

A moving image processing apparatus cumulatively sums for each reference block and in a predetermined sequence, values representing differences between corresponding pixels in a first block of a reduced image of a given image and a reference block within a search range in a reduced reference image; detects a motion vector of the first block, based on a calculation result; compares the amounts of increase among intervals of the summing process when the evaluation value is calculated for the reference block represented by the motion vector; and based on the comparison, determines a sequence to be used when the evaluation value of the reference block is calculated by cumulatively summing the values that represent differences between corresponding pixels in a second block in the given image and corresponding to the first block, and in a reference block within a search range in the reference image indicated by the motion vector.

11 Claims, 23 Drawing Sheets

(56) References Cited

U.S. PATENT DOCUMENTS

| | | | | |
|---|---|---|---|---|
| 5,659,364 A * | 8/1997 | Aoki | G06T 7/2013 | 348/416.1 |
| 7,320,522 B2 * | 1/2008 | Fujimoto | H04N 19/51 | 353/121 |
| 7,821,540 B2 * | 10/2010 | Kurata | G06T 7/2013 | 348/208.6 |
| 8,462,265 B2 * | 6/2013 | Lu | H04N 5/144 | 348/448 |
| 8,730,393 B2 * | 5/2014 | Lu | H04N 5/144 | 348/448 |
| 2007/0153908 A1 | 7/2007 | Lin | | |
| 2007/0195172 A1 * | 8/2007 | Kurata | G06T 7/2013 | 348/208.99 |
| 2008/0175439 A1 * | 7/2008 | Kurata | G06T 7/2013 | 382/107 |
| 2012/0092553 A1 * | 4/2012 | Lu | H04N 5/144 | 348/441 |
| 2013/0314595 A1 * | 11/2013 | Lu | H04N 5/144 | 348/452 |
| 2015/0003528 A1 * | 1/2015 | Toichi | H04N 19/521 | 375/240.14 |
| 2015/0350670 A1 * | 12/2015 | Yoneoka | H04N 19/53 | 375/240.16 |

FOREIGN PATENT DOCUMENTS

| | | |
|---|---|---|
| JP | 2007-183901 | 7/2007 |
| JP | 2007-228156 | 9/2007 |
| JP | 2009-55410 | 3/2009 |

* cited by examiner

MOVING IMAGE PROCESSING APPARATUS, MOVING IMAGE PROCESSING METHOD, AND COMPUTER PRODUCT

CROSS REFERENCE TO RELATED APPLICATIONS

This application is based upon and claims the benefit of priority of the prior Japanese Patent Application No. 2013-055687, filed on Mar. 18, 2013, the entire contents of which are incorporated herein by reference.

FIELD

The embodiments discussed herein are related to a moving image processing apparatus, a moving image processing method, and a computer product.

BACKGROUND

Motion detection is a process where a reference frame is searched for a block that is similar to a source block in a frame to be processed among a series of frames; and the difference in the spatial position between the block and the source block is output as a motion vector. To improve the precision of the motion detection, for example, evaluating as many candidate vectors as possible is required. On the other hand, when the number of candidate vectors increases, the amount of computation necessary for the motion detection increases and therefore, the processing time and the power consumption of the apparatus overall increase.

For example, according to a related technique, a sum-of-absolute-differences (SAD) computation is executed using pixels in a block of a frame and pixels in a comparative block of a search window in a frame that precedes the frame by one frame; and when the cumulative value of SAD values is greater than or equal to the smallest SAD value thus far, the SAD computation is discontinued. According to a signal processing method for executing motion compensation prediction between two images separated from each other in the time series, a block matching process that is executed in an unprocessed region in the search area after the sum of absolute differences of the pixel values reaches a predetermined threshold value for the first time, is forcibly terminated. The sum of absolute differences is an index for detecting the motion vector.

According to a technique referred to as "hierarchical search method", motion detection is executed for a subsampled reduced image. In the hierarchical search method, for example, in a first stage motion detection process, an approximate motion vector is derived using an image acquired by a reduced original image; and in a second stage motion detection process, motion detection is executed for a search range centered about a point represented by the motion vector that is the result of the first stage motion detection, using the original image and a reference image. For examples of the above techniques, refer to Japanese Laid-Open Patent Publication Nos. 2007-183901, H10-271514, and H11-298904).

However, according to the conventional techniques, the amount of computation necessary for the motion detection still becomes enormous associated with increases in the number of candidate vectors. Consequently, a problem arises in that the processing time and the power consumption of the overall apparatus necessary for the motion detection increase.

SUMMARY

According to an aspect of an embodiment, a moving image processing apparatus includes a processor that is configured to calculate an evaluation value for each reference block by cumulatively summing in a predetermined sequence, values that each represent a difference between corresponding pixels in a first block that is obtained by dividing an image that is obtained by reducing a given image that is to be processed and a reference block within a search range in an image that is obtained by reducing a reference image; record corresponding to an interval formed by partitioning a process of cumulatively summing the values when an evaluation value for the reference block is calculated, an amount of increase of the values in the interval; detect a motion vector of the first block, based on a calculation result; compare based on contents of a recorded record, the amounts of increase among the intervals of the process of cumulatively summing the values when the evaluation value is calculated for the reference block represented by the detected motion vector; and determine based on a comparison result, a cumulative sum sequence that is to be used when the evaluation value of the reference block is calculated by cumulatively summing the values that each represent a difference between corresponding pixels in a second block, which is in the given image and corresponds to the first block, and a reference block that is within a search range in the reference image indicated by the motion vector.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a moving image processing apparatus, a moving image processing method, and a moving image processing program will be described in detail with reference to the accompanying drawings.

Figure 1:
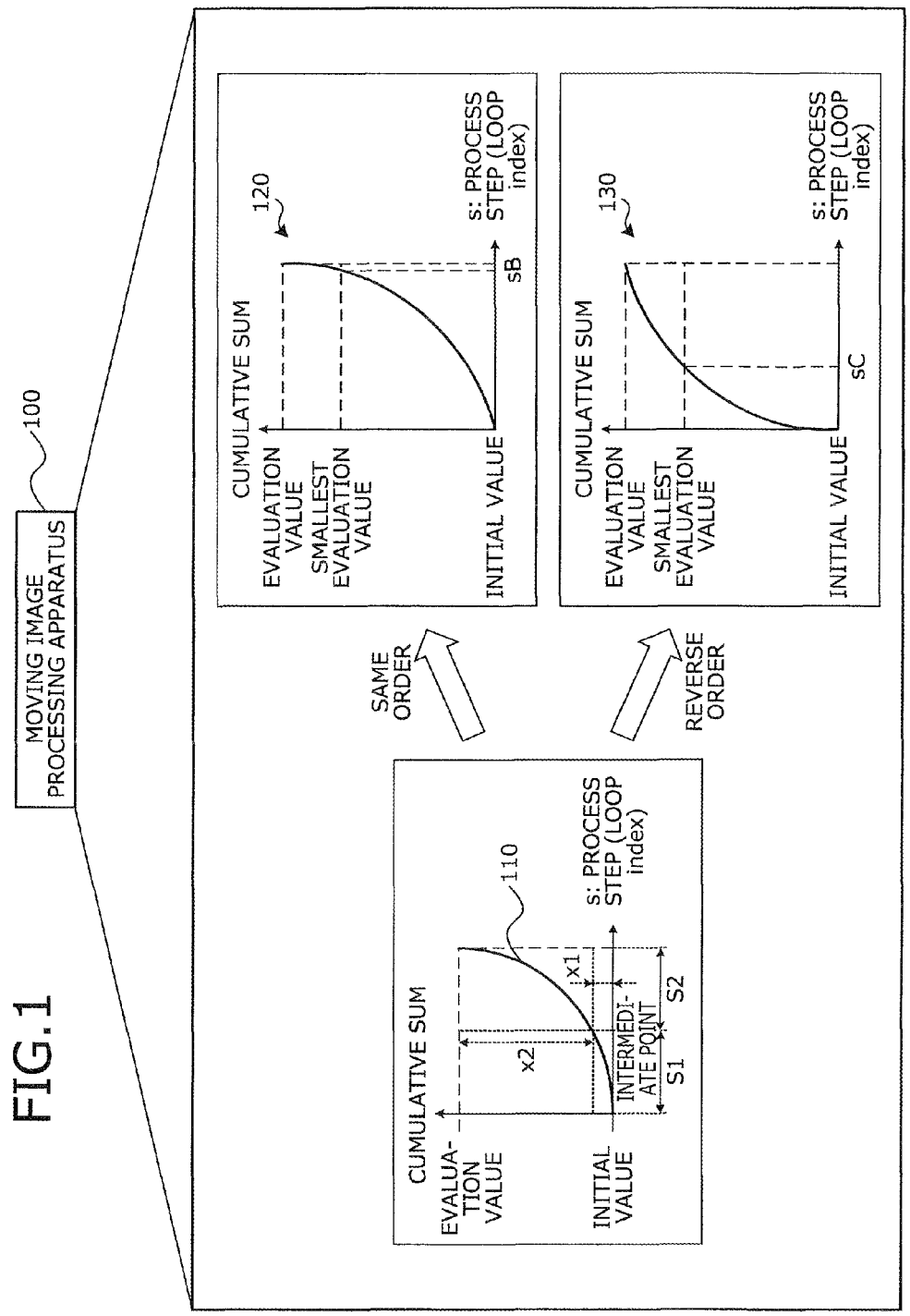
FIG. 1 is an explanatory diagram of an example of a moving image processing method according to an embodiment.

FIG. 1 is an explanatory diagram of an example of a moving image processing method according to the embodiment. In FIG. 1, a moving image processing apparatus 100 is a computer that executes hierarchical motion detection. The "hierarchical motion detection" is an approach according to which the motion detection process is divided into plural stages; a motion detection process is executed more for images obtained by reducing an image and a reference image at an earlier stage; and at a second stage and thereafter, the motion detection process is executed for a search range in a reference image indicated by a motion vector detected in the previous stage.

The "motion detection process" is a process according to which a reference image is searched for a block that is similar to a source block obtained by dividing an image that is to be processed; and the difference in the spatial position between the block and the source block is output as a motion vector. The "image to be processed" is an image of a frame that is to be processed in the processing of a series of frames that form the moving image. The image to be processed may be the original image in the frame to be processed or may be an image obtained by reducing the original image of the frame to be processed.

The "reference image" is an image of a reference frame that is searched for a block that is similar to a block obtained by dividing the image to be processed among a series of frames. A "block" is a portion of an image and is formed by partitioning the image to be processed or the reference image into, for example, 8×8-pixel units or 16×16-pixel units. An image to be processed by inter-frame prediction, such a macro block or block partition, is processed in units of blocks.

For example, at the first stage motion detection process, the moving image processing apparatus 100 detects a motion vector by using an image obtained by reducing the image to be processed and another image obtained by reducing the reference image both at a predetermined reduction rate. For example, the moving image processing apparatus 100 calculates for each candidate vector that is a candidate of the motion vector, an evaluation value that represents the difference between a reference block corresponding to the candidate vector and the source block. The moving image processing apparatus 100 outputs as the motion vector, the candidate vector whose calculated evaluation value is the smallest; and at the motion detection process in the second stage, uses the image to be processed and the reference image to again searches for the motion vector within the search range centered about a point that is in the image to be processed and indicated by the motion vector that is obtained at the first stage motion detection.

The "evaluation value" is calculated by, for example, the cumulative sum of values that each represent the difference of corresponding pixels in the source block and the reference block; and is an index to determine the similarity degree between the source block and the reference block. The "value representing the difference between the pixels" is, for example, an absolute value of the difference in the pixel value between the pixels. The "pixel value" is information concerning the color shown by the pixel; and for example, may be a component value such as the luma component value, the blue color difference component value, or the red color difference component value, or may be a component value such as the red component value, the green component value, or the blue component value.

The evaluation value is, for example, a sum of absolute differences (SAD), a sum of absolute transformed differences (SAID), or a sum of squared differences (SSD). In the calculation process (cumulative sum computation) of the evaluation value of each reference block, for example, in the process of calculating the cumulative sum of values that each represent the difference between the pixels, when the cumulative sum exceeds an already calculated evaluation value of another reference block, the evaluation value calculation process is discontinued because the evaluation value will not represent the best evaluation value among the evaluation values of the source block even if the cumulative sum process continues to be executed.

High correlation exists between an area represented by a motion vector that is the result of k-th stage motion detection (k: a natural number) in the hierarchical motion detection and a reference block searched for at the (k+1)th stage motion detection process. Therefore, the variation of the cumulative sum in the derivation of the evaluation value at the k-th stage motion detection process and that at the (k+1)th stage motion detection process represent substantially the same variation when corrected by the image reduction rate.

In this embodiment, the moving image processing apparatus 100, at the first stage motion detection process, compares the amount of increase between intervals obtained by partitioning the process of calculating the cumulative sum of the values that each represent the difference between pixels. At the second stage motion detection process, the moving image processing apparatus 100 determines based on the result of the comparison, a cumulative sum sequence that is highly likely to enable the cumulative sum computation to be discontinued at a stage as earlier as possible. An example of moving image processing of the moving image processing apparatus 100 will be described.

(1) The moving image processing apparatus 100 cumulatively sums, in a predetermined sequence, the values that each represent the difference between corresponding pixels in a first block obtained by dividing an image obtained by reducing an image that is to be processed and in a reference block that is within the search range, in an image obtained by reducing the reference image; and thereby, calculates an evaluation value for each reference block. The "predetermined sequence" is, for example, the raster scan order.

(2) Corresponding to the intervals formed by partitioning the process of calculating the cumulative sum of the values that each represent the difference between the pixels when the evaluation value of the reference block is calculated, the moving image processing apparatus 100 records the amount of increase of the value representing the difference between the pixels in the interval. When the evaluation value of a reference block is calculated, one processing session of calculating the cumulative sum of the values that each represents the difference between pixels will be referred to as "one process step".

In this case, for example, the moving image processing apparatus 100 partitions the total number of process steps up to the process step at which the evaluation value of the reference block is calculated and thereby, divides into plural intervals, the process of calculating the cumulative sum the values that each represent the difference between pixels. Taking a case where the process is divided into two intervals as an example, the moving image processing apparatus 100 divides the process of calculating the cumulative sum the values that each represent the difference between pixels, into intervals S1 and S2.

The moving image processing apparatus 100 records the amount of increase of the value that represent the difference between the pixels in the interval S1 and records the amount of increase of the value that represent the difference between the pixels in the interval S2. However, the amount of increase in the interval S2 (or S1) may be acquired by subtracting the amount of increase in the interval S1 (or S2) from the evaluation value of the reference block.

(3) Based on the calculated evaluation value of each reference block, the moving image processing apparatus 100 detects a first motion vector of the first block. For example, the moving image processing apparatus 100 detects, as the first motion vector of the first block, a candidate vector that represent a reference block whose calculated evaluation value is the smallest.

(4) Based on the recorded content of the record, the moving image processing apparatus 100 compares the amounts of increase in the intervals, in the process of calculating the cumulative sum the values that each represent the difference between pixels when the evaluation value of the reference block represented by the detected first motion vector is calculated. With reference to graph 110, a state will be described where the values that each represents the difference between pixels are cumulatively summed when the evaluation value of the reference block is calculated.

Graph 110 shows an example of temporal variation of the cumulative sum obtained when the evaluation value of the reference block represented by the first motion vector is calculated. It is assumed that the process of calculating the cumulative sum the values that each represents the difference between pixels is divided into two intervals S1 and S2. In graph 110, associated with an increase in the number of process steps, the cumulative sum gradually increases up to a midpoint and rapidly increases in the portion thereafter.

In this case, the moving image processing apparatus 100 compares a value x1 of increase in the interval S1 with a value x2 of increase in the interval S2 (x1<x2). In the example of FIG. 1, it is assumed that the evaluation value of the reference block is a value obtained by adding the coding cost by the vector to the SAD and that the initial value of the cumulative sum is not "zero" but rather, the value of the coding cost by the vector.

(5) Based on the comparison result, the moving image processing apparatus 100 determines the cumulative sum sequence to cumulatively sum the values that each represent the difference between corresponding pixels in a second block of the image to be processed corresponding to the first block and the reference block within the search range in the reference image indicated by the first motion vector. A reference block used in the second stage motion detection process is a block in the reference image indicated by the first motion vector and blocks surrounding the block, and has high similarity to the reference blocks in the first stage motion detection process.

Therefore, for most of the candidate vectors, it is predicted that the temporal variation of the cumulative sum in the second stage motion detection process forms a curve that is similar to or that somewhat exceeds the curve obtained from the first stage motion detection process. Therefore, temporal variations of the cumulative sum in the derivation of the evaluation value at the first stage motion detection process and at the second stage motion detection process present substantially equal variations when differences in the reduction rate of the image and in the number of process steps are corrected.

Graphs 120 and 130 each show the temporal variation of the cumulative sum predicted when the evaluation value of the reference block within the search range in the reference image indicated by the first motion vector is calculated. For example, graph 120 shows the temporal variation of the cumulative sum predicted when the cumulative sum is calculated in the same sequence as that at the first stage motion detection process. The number of process steps "sB" is the number of process steps necessary for reaching the smallest evaluation value.

The graph 130 shows the temporal variation of the cumulative sum predicted when the cumulative sum is calculated in reverse order of that at the first stage motion detection process. The number of process steps "sC" is the number of process steps necessary for reaching the smallest evaluation value. The "smallest evaluation value" is the smallest evaluation value that has been calculated.

The computation to cumulatively sum the evaluation values in each of the reference blocks (the candidate vectors) is discontinued at, for example, the time point at which the cumulative sum exceeds the smallest evaluation value. Therefore, at the second stage motion detection process, it is more desirable for the cumulative sum to be performed as shown in graph 130, which indicates that the smallest evaluation value is reached with the number of process steps sC, which is smaller than the number of process steps sB indicated in the graph 120.

At the second stage motion detection process, it is highly likely that the computation of the cumulative sum is discontinued with a smaller number of process steps when the cumulative sum is executed in a sequence reverse to that of the first stage motion detection process. For example, when the value x2 of the increase in the interval S2 exceeds the value x1 of the increase in the interval S1, the moving image processing apparatus 100 determines that the cumulative sum sequence in the second stage motion detection process is to be the reverse order of the cumulative sum sequence in the first stage motion detection process.

As described, according to the moving image processing apparatus 100, the amounts of increase can be compared among the divided intervals formed by partitioning the process of calculating the cumulative sum the values that each represent the difference between pixels at the first stage motion detection process. According to the moving image processing apparatus 100, based on the comparison result, a cumulative sum sequence can be determined that is highly likely to enable the computation of the cumulative sum to be discontinued with a smaller number of process steps at the second stage motion detection process.

Thereby, the probability that the computation of the cumulative sum at the second stage motion detection process can be discontinued with a smaller number of process steps can be increased, whereby the amount of computation necessary for the motion detection can be reduced, enabling the amount of computation necessary for the motion detection to be reduced. Consequently, the processing time and the power consumed by the moving image processing apparatus 100 for motion detection can be reduced.

An example of a hardware configuration will be described of a computer system 200 to which the moving image processing apparatus 100 is applied. The computer system 200 is, for example, a system having functions to record and reproduce a moving image and is, for example, a personal computer, a television, a recorder, a smartphone, a video camera, a digital camera, or a portable telephone.

Figure 2:
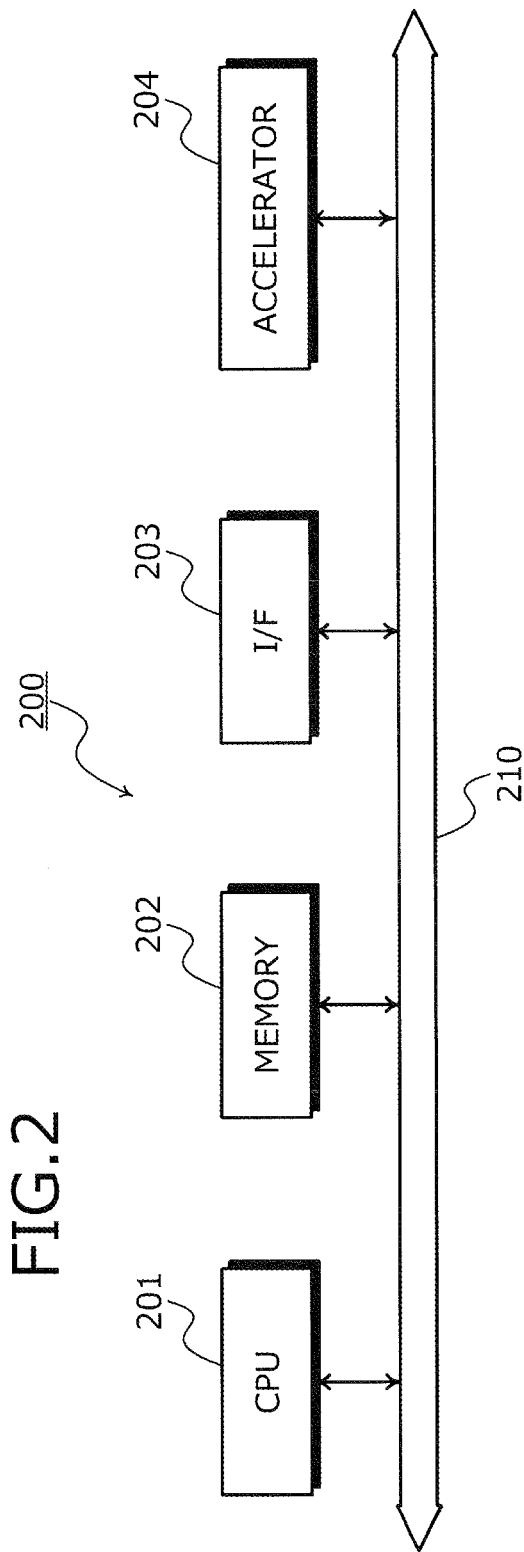
FIG. 2 is a block diagram of a hardware configuration of a computer system 200.

FIG. 2 is a block diagram of a hardware configuration of the computer system 200. As depicted in FIG. 2, the computer system 200 includes a central processing unit (CPU) 201, memory 202, and an interface (I/F) 203, respectively connected by a bus 210.

The CPU 201 governs overall control of the computer system 200. The memory 202 includes, for example, read-only memory (ROM), random access memory (RAM), flash ROM, and the like. For example, the flash ROM stores programs such as an OS and firmware, the ROM stores applications, and the RAM is used as a work area of the CPU 201. Programs stored in the memory 202 are loaded onto the CPU 201, whereby the CPU 201 is caused to execute encoded processes of the program.

The I/F 203 controls the input and output of data with respect to other apparatuses. For example, the I/F 203 is connected to a network such as a local area network (LAN), a wide area network (WAN), and the Internet, via a communication, line, and through the network, is connected to other apparatuses. The I/F 203 administers an internal interface with the network to control the input and output of data with respect to other apparatuses. The computer system 200 may include, in addition to the configuration above, a magnetic disk drive, a magnetic disk, a display, a keyboard, a mouse, an image sensor, etc. An accelerator 204 includes hardware that implements a portion of CPU image processing.

Figure 3:
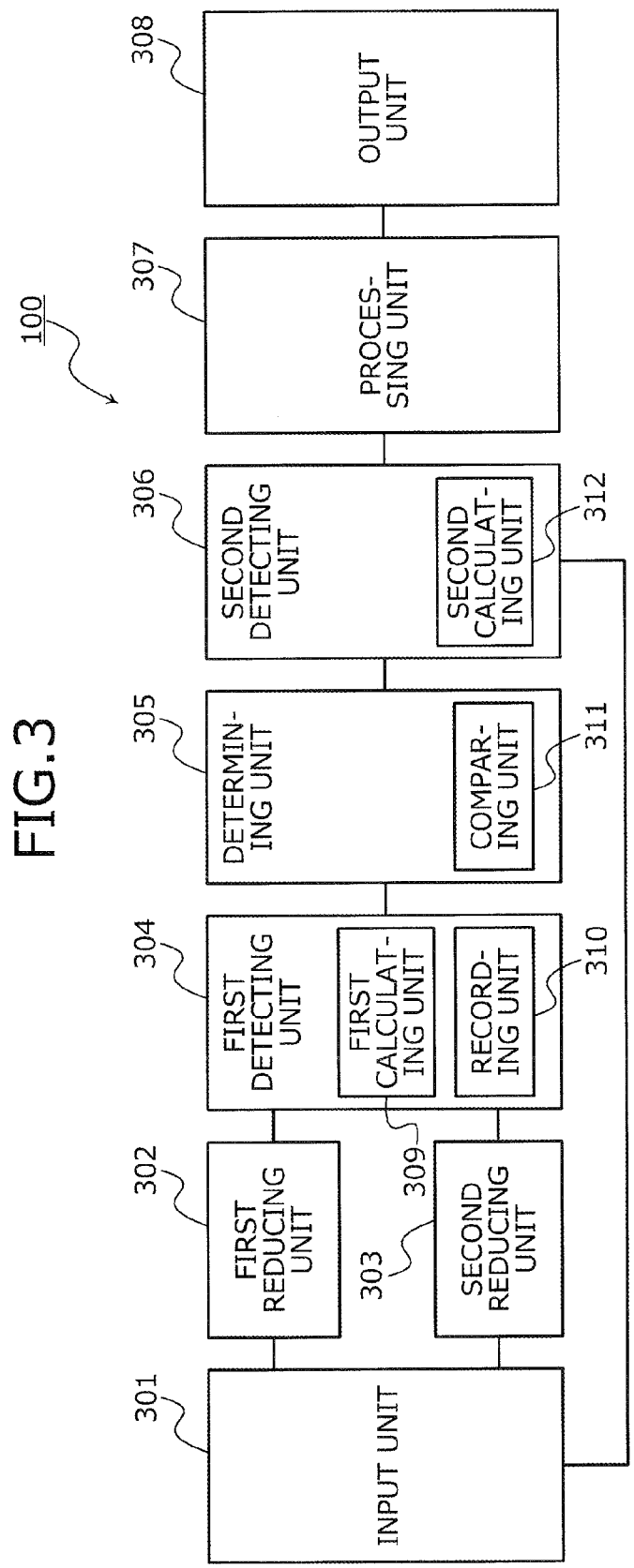
FIG. 3 is a block diagram of an example of a functional configuration of a moving image processing apparatus 100.

FIG. 3 is a block diagram of an example of a functional configuration of the moving image processing apparatus 100. In FIG. 3, the moving image processing apparatus 100 includes an input unit 301, a first and a second reducing units 302 and 303, a first and a second detecting units 304 and 306, a determining unit 305, a processing unit 307, and an output unit 308. For example, these functional units may each be formed by an element such as an "AND" that is a logical multiplication circuit, an "INVERTER" that is a negative logical circuit, an "OR" that is a logical sum circuit, a "NOR" that is a non-logical sum circuit, a "flip-flop (FF)" that is a latch circuit, etc. The functions of the functional units may each be defined by a description language such as, for example, Verilog-Hardware Description Language (HDL) and the description may be logically synthesized and implemented by a field programmable gate array (FPGA). Functions of the functional units may be implemented by causing the CPU 201 to execute programs stored in the memory 202 depicted in FIG. 2; by using the accelerator 204; or by using the CPU 201 and the accelerator 204 to divide the processing therefor and to implement the functions by the processing overall.

The input unit 301 receives an input of an image OP that is to be processed. The image OP is an image of the frame that is to be processed among a series of frames that form a moving image. The image OP may be, for example, the original image of the frame to be processed or may be an image obtained by reducing the original image of the frame to be processed. For example, the input unit 301 receives the input of the image OP, which is stored in the memory 202, through a memory controller (not depicted) that controls the input and output of data with respect to the memory 202.

The input unit 301 also receives an input of a reference image RP. The "reference image RP" is an image of a reference frame from which a block is obtained that is similar to a block obtained by dividing the image OP among the series of frames, and is, for example, a decoded image (for example, a local decoded image) of the reference frame. For example, the input unit 301 receives the input of a reference image stored in the memory 202, through the memory controller (not depicted).

The first reducing unit 302 reduces the image OP at a predetermined reduction rate α. For example, when the reduction rate α is "α=0.5", the first reducing unit 302 sub-samples the image OP such that the image OP is reduced to half, in both the horizontal and the vertical directions, and produces a reduced image of the image OP.

The second reducing unit 303 reduces the reference image RP at the reduction rate α. For example, when the reduction rate α is "α=0.5", the second reducing unit 303 sub-samples the reference image RP such that the reference image RP is reduced to half in both the horizontal and the vertical directions, and produces a reduced image of the reference image RP.

In the description above, description has been made taking an example where the first and the second reducing units 302 and 303 are provided separately from each other. However, configuration is not limited hereto. For example, one reducing unit may process in a time-sharing manner, the image OP and the reference image RP and, thereby, may produce the reduced images of the image OP and the reference image RP.

In the description above, a reduced image production method based on sub sampling has been described. However, the production of the reduced images is not limited hereto. Any arbitrary reduced image production method is applicable.

Based on the reduced images of the image OP and the reference image RP, the first detecting unit 304 detects a first motion vector V1 of the block of the reduced image of the image OP. The first motion vector V1 is a vector that represents the difference in the spatial position between the block of the reduced image of the image OP and the reference block that is within the search range in the reduced image of the reference image RP.

In the description below, the block of the reduced image of the image OP may be written as "source block b" and the reference block that is within the search range in the reduced image of the reference image RP may be written as "reference block rb". The search range in the reduced image of the reference image RP is specified in advance. The search range is, for example, a range of ±15 pixels centered about the position of the source block b, on the reduced image of the reference image RP.

For example, the first detecting unit 304 includes a first calculating unit 309 and a recording unit 310. The first calculating unit 309 sequentially selects the reference blocks rb within the search range, in the reduced image of the reference image RP at one-pixel precision (or half-pixel precision, ¼-pixel precision, etc.); cumulatively sums in a cumulative sum sequence X, the values each representing the difference between the corresponding pixels of the source block b and the reference block rb; and thereby, calculates the evaluation value for each reference block rb.

The "cumulative sum sequence X" is the sequence in which the values that each represent the difference between pixels are cumulatively summed, that is, a sequence that indicates in what order the pixels are selected from the source block b. The "cumulative sum sequence X", for example, is a raster scan order where the pixel at upper left of the source block b is regarded as the starting point and the pixel at lower right of the source block b regarded as the ending point.

In the description below, the evaluation value of the reference block rb (or a reference block RB described later) may be written as "evaluation value SAD". The "evaluation value SAD" is, for example, the total of the absolute values of the differences each between the pixel value in the source block b and that in the reference block rb. The absolute value of the difference in the pixel value between the pixels may be written as "absolute value diff".

The first detecting unit 304 detects the first motion vector V1 of the source block b, based on the evaluation value SAD for each reference block rb calculated by the first calculating unit 309. For example, the first detecting unit 304 detects as the first motion vector V1, the candidate vector that corresponds to the reference block rb whose evaluation value SAD is smallest among the reference blocks rb within the search range in the reduced image of the reference image RP.

Corresponding to the interval formed by partitioning the process of calculating the cumulative sum of the absolute values diff when the first calculating unit 309 calculates the evaluation value SAD of the reference block rb, the recording unit 310 records the amount of increase of the absolute value diff in the interval. For example, the recording unit 310 divides the process of calculating the cumulative sum of the absolute values diff into the intervals S1 to Sn (n: a natural number that is two or larger) by partitioning the total number of process steps up to the process step at which the evaluation value SAD of the reference block rb is calculated; and for interval Si among the intervals S1 to Sn (i=1, 2, . . . , or n), records the amount of increase of the absolute value diff corresponding to the interval Si The determining unit 305 determines a cumulative sum sequence Y that is used when the evaluation value SAD of the reference block RB is calculated. The "reference block RB" is a block within the search range in the reference image RP indicated by the first motion vector V1 detected by the first detecting unit 304. The "search range in the reference image RP" is, for example, a range of about ±15 pixels centered about a point in the reference image RP indicated by the vector acquired by scaling the first motion vector V1 corresponding to the reduction rate α. The cumulative sum sequence Y is the sequence used when the evaluation value SAD of the reference block RB is calculated by cumulatively summing the absolute values diff respectively between corresponding pixels in the source block B in the image OP corresponding to the source block b and in the reference block RB.

For example, the determining unit 305 includes a comparing unit 311. The comparing unit 311 compares the amounts of increase among the intervals of the process of cumulatively summing the absolute values diff when the evaluation value SAD of the reference block rb represented by the first motion vector V1 is calculated. Based on the comparison result acquired by the comparison by the comparing unit 311, the determining unit 305 determines the cumulative sum sequence Y that is used when the evaluation value SAD of the reference block RB is calculated. The details of the processing by the determining unit 305 will be described later with reference to FIGS. 4 and 5.

The second detecting unit 306 detects based on the image OP and the reference image RP, a second motion vector V2 of the source block B that is obtained by dividing the image OP. The second motion vector V2 is a vector that represents the difference in the spatial position between the source block B that is obtained by dividing the image OP and the reference block RB that is within the search range of the reference image RP indicated by the first motion vector V1.

For example, the second detecting unit 306 includes a second calculating unit 312. The second calculating unit 312 sequentially selects the reference blocks RB within the search range in the reference image RP at one-pixel precision (or half-pixel precision, ¼-pixel precision, etc.), cumulatively sums the absolute values diff between the corresponding pixels of the source block B and the reference block RB according to the cumulative sum sequence Y determined by the determining unit 305, and thereby, calculates the evaluation value SAD for each reference block RB.

The second detecting unit 306 detects the second motion vector V2 of the source block B, based on the calculated evaluation value SAD of each reference block RB. For example, the second detecting unit 306 detects as the second motion vector V2, the candidate vector that corresponds to the reference block RB whose evaluation value SAD is smallest among the reference blocks RB within the search range in the reference image RP.

The processing unit 307 executes a predetermined process based on the detected second motion vector V2. For example, when the image OP is an image to be encoded, the processing unit 307 may produce an inter-frame prediction image, based on the source block B and the reference block RB in the reference image RP represented by the second motion vector V2. The processing unit 307 may encode the differential image between the image OP (the source block B) and the inter-frame prediction image.

For example, when the image OP is an image to be subject to image stabilization, the processing unit 307 may detect a dislocation amount between the image OP and the reference image RP, based on the detected second motion vector V2. The second motion vector V2 is, for example, a motion vector for the source block B in a characteristic portion of the image OP detected by the second detecting unit 306.

The source block B in the characteristic portion is, for example, the source block B in an edge portion of the image OP. The processing unit 307 may detect the dislocation amount between the image OP and the reference image RP by calculating the average value of the second motion vectors V2 for the source blocks B in the characteristic portion of the image OP.

The output unit 308 outputs the process result of the process executed by the processing unit 307. For example, the output unit 308 may output the inter-frame prediction image produced by the processing unit 307 or may output the bit stream encoded by the processing unit 307. For example, the output unit 308 may output the dislocation amount between the image OP and the reference image RP, detected by the processing unit 307.

Configuration of the moving image processing apparatus 100 may be such that the processing unit 307 is omitted. In this case, the output unit 308 may, for example, output the second motion vector V2 of the source block B detected by the second detecting unit 306, to another apparatus that implements a function equivalent to that of the processing unit 307.

Details of the processing by the determining unit 305 will be described.

A first determination process will be described. It is assumed that the process of calculating the cumulative sum of the absolute values diff is divided into the intervals S1 and S2 by partitioning into two equal halves (n=2), the total number of process steps up to the process step at which the evaluation value SAD of the reference block rb is calculated.

In this case, the recording unit 310 records, for example, the amount of increase of each absolute value diff in the interval S1 and in the interval S2. The comparing unit 311 compares the amounts of increase between the intervals S1 and S2 in the process of calculating the cumulative sum of the absolute values diff when the evaluation value SAD is calculated for the reference block rb represented by the first motion vector V1.

When the amount of increase in the interval S1 is greater than or equal to that of the interval S2, for the calculation of the evaluation value SAD of the reference block RB, it is highly likely that the smallest evaluation value "minSAD" is reached with a fewer number of process steps in a case where the absolute values diff are cumulatively summed in the same sequence as the cumulative sum sequence X than in a case where the absolute values diff are cumulatively summed in the reverse order of the cumulative sum sequence X.

Therefore, when the amount of increase in the interval S1 is greater than or equal to that in the interval S2, the determining unit 305 determines that the cumulative sum sequence Y is the same sequence as the cumulative sum sequence X. The smallest evaluation value minSAD is the smallest evaluation value SAD that is already calculated for another reference block RB when the evaluation value SAD of the reference block RB is calculated.

On the other hand, for the calculation of the evaluation value SAD of the reference block RB, when the amount of increase in the interval S1 is less than that of the interval S2, it is highly likely that the smallest evaluation value minSAD is reached with a fewer number of process steps in a case where the absolute values diff are cumulatively summed in the reverse order of the cumulative sum sequence X than in a case where the absolute values diff are cumulatively summed in the same sequence as the cumulative sum sequence X. The determining unit 305 determines that the cumulative sum sequence Y is the reverse order of the cumulative sum sequence X when the amount of increase in the interval S1 is less than that of the interval S2.

It is assumed as an example that the cumulative sum sequence X is the raster scan order with a pixel at upper left of the source block b being regarded as the starting point and a pixel at lower right of the source block b being regarded as the ending point. In this case, the reverse order of the cumulative sum sequence X is the raster scan order where the pixel at lower right of the source block b is regarded as the starting point and the pixel at upper left of the source block b is regarded as the ending point.

A second determination process will be described. It is assumed that the process of calculating the cumulative sum of the absolute values diff is divided into the intervals S1, S2 and an interval S3 by dividing the total number of process steps up to the process step at which the evaluation value SAD of the reference block rb is calculated, into three intervals (n=3).

Figure 4:
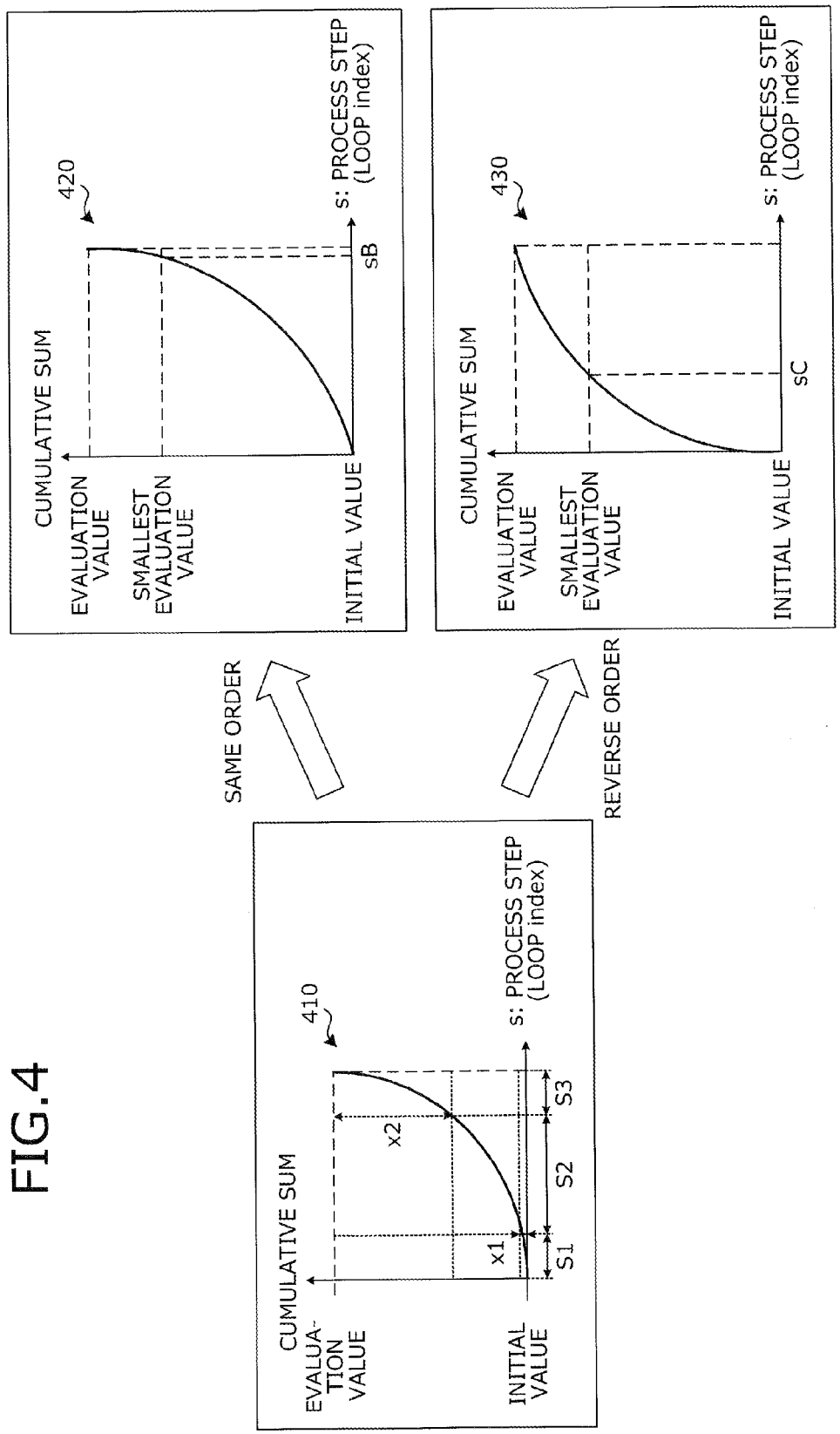
FIG. 4 is an explanatory diagram (Part I) of temporal variation of a cumulative sum.

FIG. 4 is an explanatory diagram (Part I) of the temporal variation of the cumulative sum. In FIG. 4, a graph 410 shows an example of temporal variation of the cumulative sum of the absolute values diff obtained when the evaluation value SAD is calculated for the reference block rb represented by the first motion vector V1. The process of calculating the cumulative sum of the absolute values diff is divided into the intervals S1, S2, and S3. In the graph 410, the degree of increase of the cumulative sum of the absolute values diff is high in the interval S3 compared to that in the interval S1. The intervals of the intervals S1 and S3 are equal.

In this case, the recording unit 310 records, for example, the amount of increase of each absolute value diff in the interval S1 and that in the interval S3. The comparing unit 311 compares the amounts of increase between the intervals S1 and S3 in the process of calculating the cumulative sum of the absolute values diff when the evaluation value SAD is calculated for the reference block rb represented by the first motion vector V1.

Graphs 420 and 430 each show an example of predicted temporal variation of the cumulative sum of the absolute values diff, when the evaluation value SAD is calculated for the reference block RB within the search range in the reference image RP indicated by the first motion vector V1. For example, the graph 420 shows the temporal variation of the cumulative sum predicted when the absolute values diff are cumulatively summed in the same sequence as the cumulative sum sequence X. The number of process steps sB may be the number of process steps to reach the predicted smallest evaluation value minSAD, or the predicted number of process steps to reach the smallest evaluation value minSAD.

The graph 430 shows the temporal variation of the cumulative sum predicted when the absolute values diff are cumulatively summed in the reverse order of the cumulative sum sequence X. The number of process steps sC is the number of process steps to reach the predicted smallest evaluation value minSAD. Comparison of the graphs 420 and 430 reveals that the smallest evaluation value minSAD is reached with a fewer number of process steps in the graph 430.

For the calculation of the evaluation value SAD of the reference block RB, when the amount of increase in the interval S1 is less than the amount of increase in the interval S3, it is highly likely that the smallest evaluation value minSAD is reached with a fewer number of process steps in a case where the absolute values diff are cumulatively summed in the reverse order of the cumulative sum sequence X than in a case where the absolute values diff are cumulatively summed in the same sequence as the cumulative sum sequence X. Therefore, when the amount of increase in the interval S1 is less than that in the interval S2, the determining unit 305 may determine that the cumulative sum sequence Y is the reverse order of the cumulative sum sequence X.

On the other hand, for the calculation of the evaluation value SAD of the reference block RB, when the amount of increase in the interval S1 is greater than or equal to that in the interval S3, it is highly likely that the smallest evaluation value minSAD is reached with a fewer number of process steps in a case where the absolute values diff are cumulatively summed in the same sequence as the cumulative sum sequence X than in a case where the absolute values diff are cumulatively summed in the reverse order of the cumulative sum sequence X. Therefore, when the amount of increase in the interval S1 is greater than or equal to that of the interval S3, the determining unit 305 may determine that the cumulative sum sequence Y is the same sequence as the cumulative sum sequence X.

Third, fourth, and fifth determination processes will be described. It is assumed that the process of calculating the cumulative sum of the absolute values diff is divided into intervals S1 to Sn by dividing the total number of process steps up to the process step at which the evaluation value SAD of the reference block rb is calculated, into n intervals.

Figure 5:
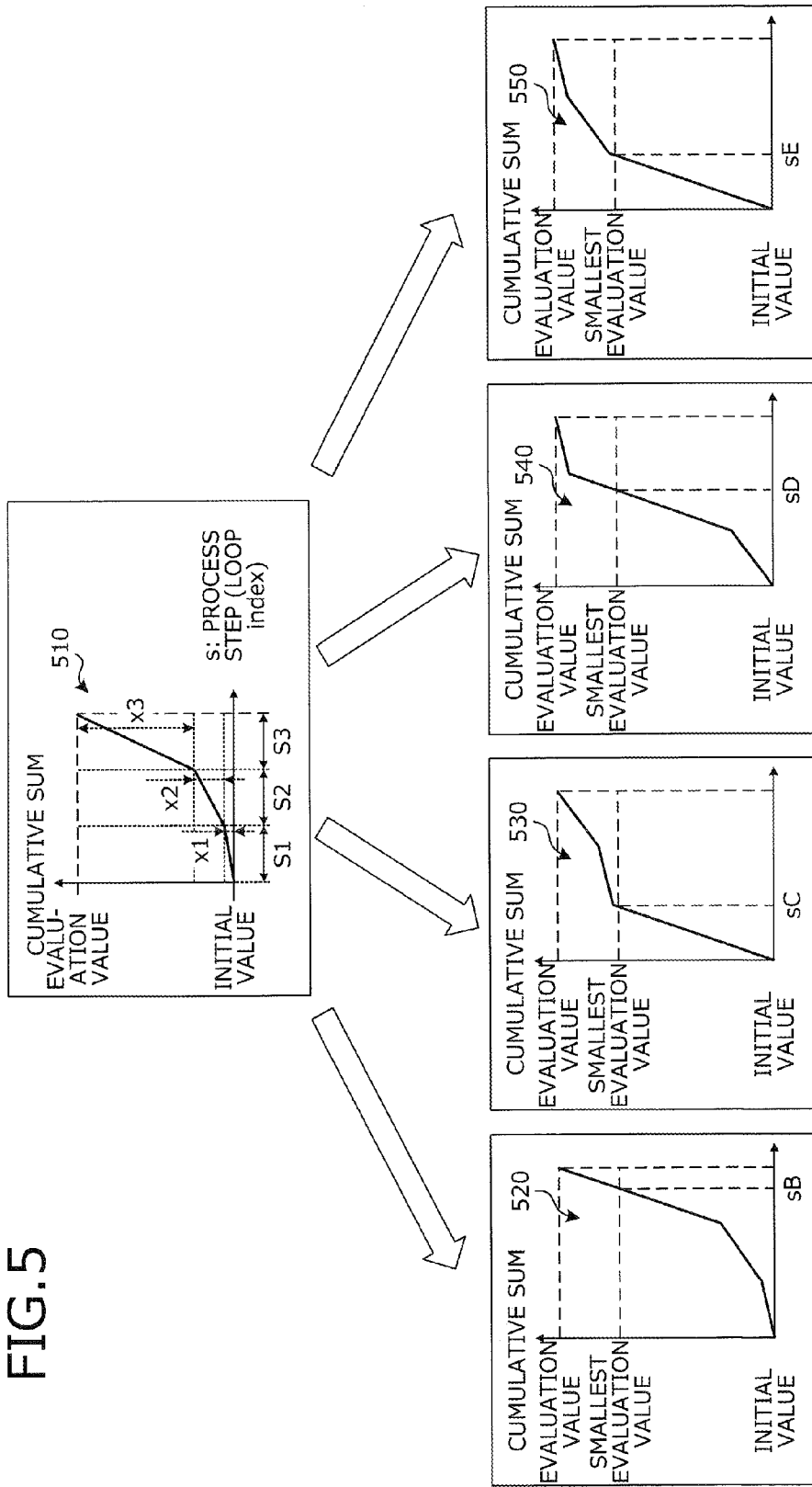
FIG. 5 is an explanatory diagram (Part II) of the temporal variation of the cumulative sum.

FIG. 5 is an explanatory diagram (Part II) of the temporal variation of the cumulative sum. In FIG. 5, a graph 510 shows an example of temporal variation of the cumulative sum of the absolute values diff obtained when the evaluation value SAD is calculated of the reference block rb represented by the first motion vector V1. The process of calculating the cumulative sum of the absolute values diff is evenly divided into the intervals S1, S2, and S3.

In this case, the recording unit 310 records, for example, the amount of increase of the absolute values diff in the interval S1, that in the interval S2, and that in the interval S3. The comparing unit 311 compares the amounts of increase among the intervals in the process of calculating the cumulatively sum of the absolute values diff when the evaluation value SAD is calculated for the reference block rb represented by the first motion vector V1.

Based on the comparison result obtained by the comparing unit 311, the determining unit 305 identifies the interval whose value of the increase is the greatest and the interval whose value of the increase is the smallest among the intervals S1 to S3. In the example of FIG. 5, the amount of increase in the interval S1 (the amount of increase "x1" in FIG. 5) is the smallest and that of the interval S3 (the amount of increase "x3" in FIG. 5) is the greatest among the intervals S1 to S3.

Graphs 520, 530, 540, and 550 each show an example of temporal variation of the cumulative sum of the absolute values diff predicted when the evaluation value SAD is calculated for the reference block RB within the search range in the reference image RP indicated by the first motion vector V1. For example, the graph 520 shows the temporal variation of the cumulative sum predicted when the absolute values diff are cumulatively summed in the same sequence as the cumulative sum sequence X. The number of process steps sB is the number of process steps to reach the predicted smallest evaluation value minSAD.

The third determination process will be described. The graph 530 shows the temporal variation of the cumulative sum predicted when the absolute value diff is cumulatively summed first for a portion corresponding to the interval S3 whose value of the increase is the greatest among the intervals S1 to S3. The number of process steps sC is the number of process steps to reach the smallest predicted evaluation value minSAD.

Comparison of the graphs 520 and 530 reveals that the smallest evaluation value minSAD is reached with a fewer number of process steps in the graph 530. When the absolute value diff is cumulatively summed first for the portion corresponding to the interval S3 whose value of the increase is the greatest among the intervals S1 to S3, it is highly likely that the smallest evaluation value minSAD is reached with a fewer number of process steps.

Therefore, the determining unit 305 may determine that the cumulative sum sequence Y is the sequence to calculate first the cumulative sum of the absolute value diff for the portion corresponding to the interval whose value of the increase is the greatest among the intervals S1 to Sn. In the example of FIG. 5, the determining unit 305 determines that the cumulative sum sequence Y is the sequence to calculate first the cumulative sum of the absolute value diff for the portion corresponding to the interval S3.

It is assumed as an example that each block is a macro block having 8×8 pixels and the pixels in the macro block are named as pixels 1 to 64 (when the pixels are numbered in the raster scan order with the pixel at the upper left being regarded as the starting point). In this case, for example, the pixels in a portion corresponding to the interval S1 are "the pixels 1 to 21", those in a portion corresponding to the interval S2 are "the pixels 22 to 44", and those in the portion corresponding to the interval S3 are "the pixels 45 to 64".

Therefore, the determining unit 305 determines that the cumulative sum sequence Y is the sequence to calculate first the cumulative sum of the absolute value diff for the pixels 45 to 64 in the block (the source block, the reference block RB). Calculation of the cumulative sum may be executed in the sequence of "the interval S1 to the interval S2" after the portion corresponding to the interval S3 or may be executed in the sequence of "the interval S2 to the interval S1" thereafter.

The fourth determination process will be described. The graph 540 shows the temporal variation of the cumulative sum predicted when the absolute value diff is cumulatively summed last for a portion corresponding to the interval S1 whose value of the increase is the smallest among the intervals S1 to S3. The number of process steps sD is the number of process steps to reach the smallest predicted evaluation value minSAD.

Comparison of the graphs 520 and 540 reveals that the smallest evaluation value minSAD is reached with a fewer number of process steps in the graph 540. When the absolute value diff is cumulatively summed last for the portion corresponding to the interval S1 whose value of the increase is the smallest among the intervals S1 to S3, it is highly likely that the smallest evaluation value minSAD is reached with a fewer number of process steps.

Therefore, the determining unit 305 may determine that the cumulative sum sequence Y is the sequence to calculate last the cumulative sum of the absolute value diff for the portion corresponding to the interval whose value of the increase is the smallest among the intervals S1 to Sn. In the example of FIG. 5, the determining unit 305 determines that the cumulative sum sequence Y is the sequence to calculate last the cumulative sum of the absolute value diff for the portion corresponding to the interval S1.

Taking the macro block of 8×8 pixels as an example, the cumulative sum sequence Y is the sequence to calculate last the cumulative sum of the absolute value diff for the pixels 1 to 21 in the block. Calculation of the cumulative sum may be executed in the sequence of "the interval S2 to the interval S3" before the portion corresponding to the interval S1 or may be executed in the sequence of "the interval S3 to the interval S2".

The fifth determination process will be described. The graph 550 shows the temporal variation of the cumulative sum predicted when the absolute value diff is first cumulatively summed for the portion corresponding to the interval S3 and the absolute value diff is lastly cumulatively summed for the portion corresponding to the interval S1. The number of process steps sE is the number of process steps to reach the smallest predicted evaluation value minSAD.

Comparison of the graphs 520 and 550 reveals that the smallest evaluation value minSAD is reached with a fewer number of process steps in the graph 550. In other words, when the absolute value diff is cumulatively summed first for the portion corresponding to the interval S3 whose value of the increase is the greatest among the intervals S1 to S3, and the absolute value diff is cumulatively summed last for the portion corresponding to the interval S1 whose value of the increase is the smallest, it is highly likely that the smallest evaluation value minSAD is reached with a fewer number of process steps.

Therefore, the determining unit 305 may determine that the cumulative sum sequence Y is the sequence to cumulatively sum first the absolute value diff of the portion corresponding to the interval whose value of the increase is the greatest among the intervals S1 to Sn and cumulatively sum last the absolute value diff of the portion corresponding to the interval whose value of the increase is the smallest.

In the example of FIG. 5, the determining unit 305 determines that the cumulative sum sequence Y is the sequence to cumulatively sum first the absolute value diff of the portion corresponding to the interval S3 and cumulatively sum last the absolute value diff of the portion corresponding to the interval S1. In the example where each block is the macro block of 8×8 pixels, the cumulative sum sequence Y is the sequence to cumulatively sum first the absolute value diff of the pixels 45 to 64 in the block and to cumulatively sum last the absolute value diff of the pixels 1 to 21.

Procedures for various processes by the moving image processing apparatus 100 will be described.

A procedure for the first determination process of the moving image processing apparatus 100 will be described. The first determination process is a process of determining the cumulative sum sequence Y that is to be used in a case where the process of calculating the cumulative sum of the absolute values diff is divided into two intervals when the evaluation value SAD of the reference block rb is calculated.

Figure 6:
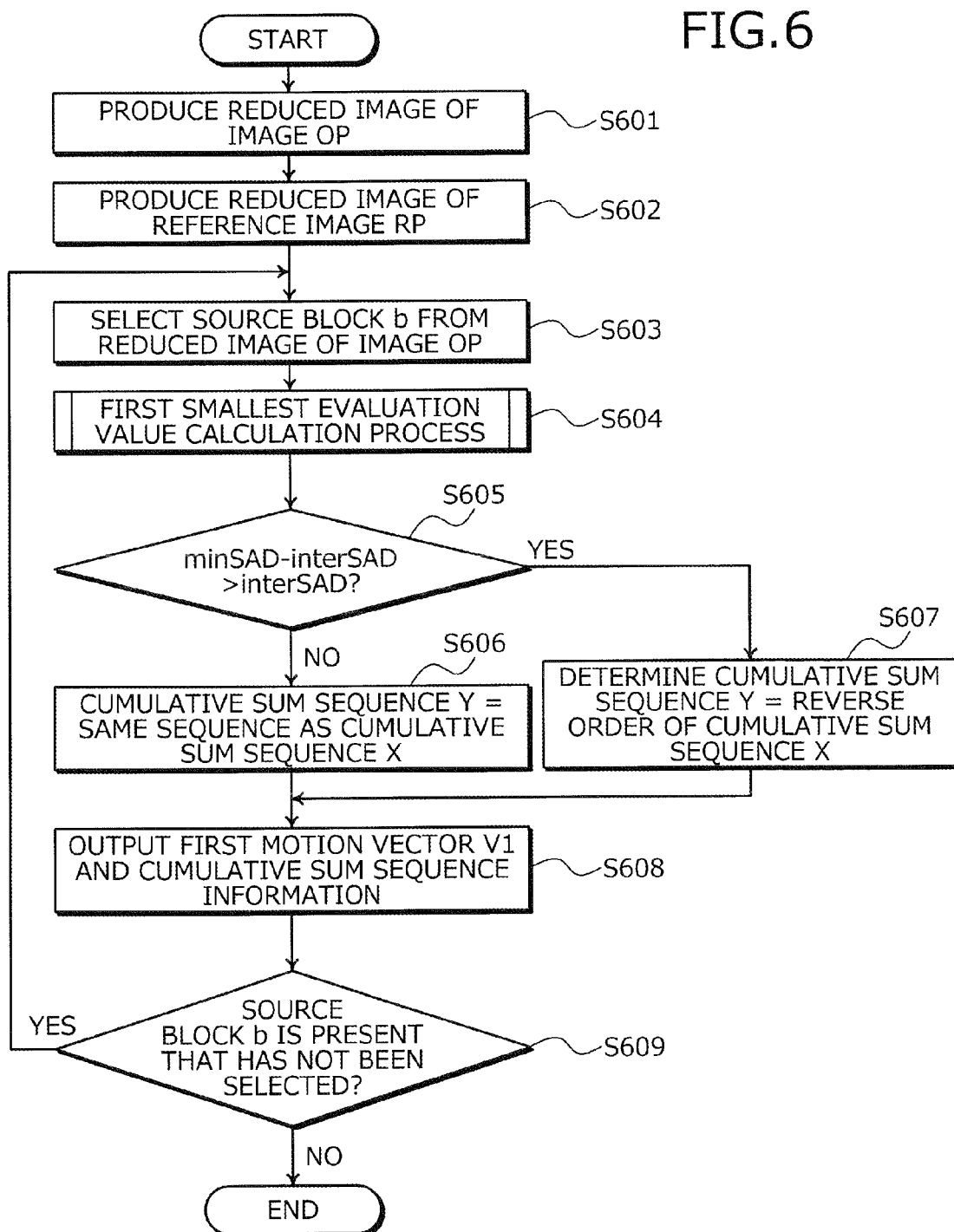
FIG. 6 is a flowchart of an example of a procedure for a first determination process.

FIG. 6 is a flowchart of an example of the procedure for the first determination process. In the flowchart of FIG. 6, the moving image processing apparatus 100 produces the reduced image of the image OP (step S601) and produces the reduced image of the reference image RP (step S602).

The moving image processing apparatus 100 selects the source block b from the reduced image of the image OP (step S603) and executes a first smallest evaluation value calculation process (step S604). The detailed process procedure for the first smallest evaluation value calculation process will be described later with reference to FIG. 7.

The moving image processing apparatus 100 determines whether "minSAD-interSAD" exceeds "interSAD" (step S605). The "minSAD" is the smallest evaluation value of the evaluation value SAD. The "interSAD" is the cumulative sum of the absolute values diff at the time point at which the check point described later is reached and corresponds to the amount of increase of the absolute value diff in the interval S1.

If the moving image processing apparatus 100 determines that "minSAD-interSAD" less than or equal to "interSAD" (step S605: NO), the moving image processing apparatus 100 determines that the cumulative sum sequence Y is the same sequence as the cumulative sum sequence X (step S606). On the other hand, if the moving image processing apparatus 100 determines that "minSAD-interSAD" exceeds "interSAD" (step S605: YES), the moving image processing apparatus 100 determines that the cumulative sum sequence Y is the reverse order of the cumulative sum sequence X (step S607).

The moving image processing apparatus 100 outputs the first motion vector V1 and cumulative sum sequence information, each being correlated with the source block b (step S608). The first motion vector is a minimal evaluation vector "vector" described later. The cumulative sum sequence information is information indicating the cumulative sum sequence Y. The moving image processing apparatus 100 determines whether a source block b is present that has not been selected from the reduced image of the image OP (step S609).

If the moving image processing apparatus 100 determines that an unselected source block b is present (step S609: YES), the moving image processing apparatus 100 returns to the operation at step S603, and selects an unselected source block b from the reduced image of the image OP. On the other hand, if the moving image processing apparatus 100 determines that no unselected source block b is present (step S609: NO), the moving image processing apparatus 100 causes the series of process steps according to this flowchart to come to an end.

Thereby, when the amount of increase in the interval S1 is greater than or equal to that in the interval S2 among the intervals S1 and S2 formed by dividing the process of calculating the cumulative sum of the absolute values diff into two interval at the first stage motion detection process, it can be determined that the cumulative sum sequence Y is the same sequence as the cumulative sum sequence X. If the amount of increase in the interval S1 is less than that in the interval S2, it can be determined that the cumulative sum sequence Y is the reverse order of the cumulative sum sequence X.

Details of a process procedure for the first smallest evaluation value calculation operation at step S604 depicted in FIG. 6 will be described.

Figure 7:
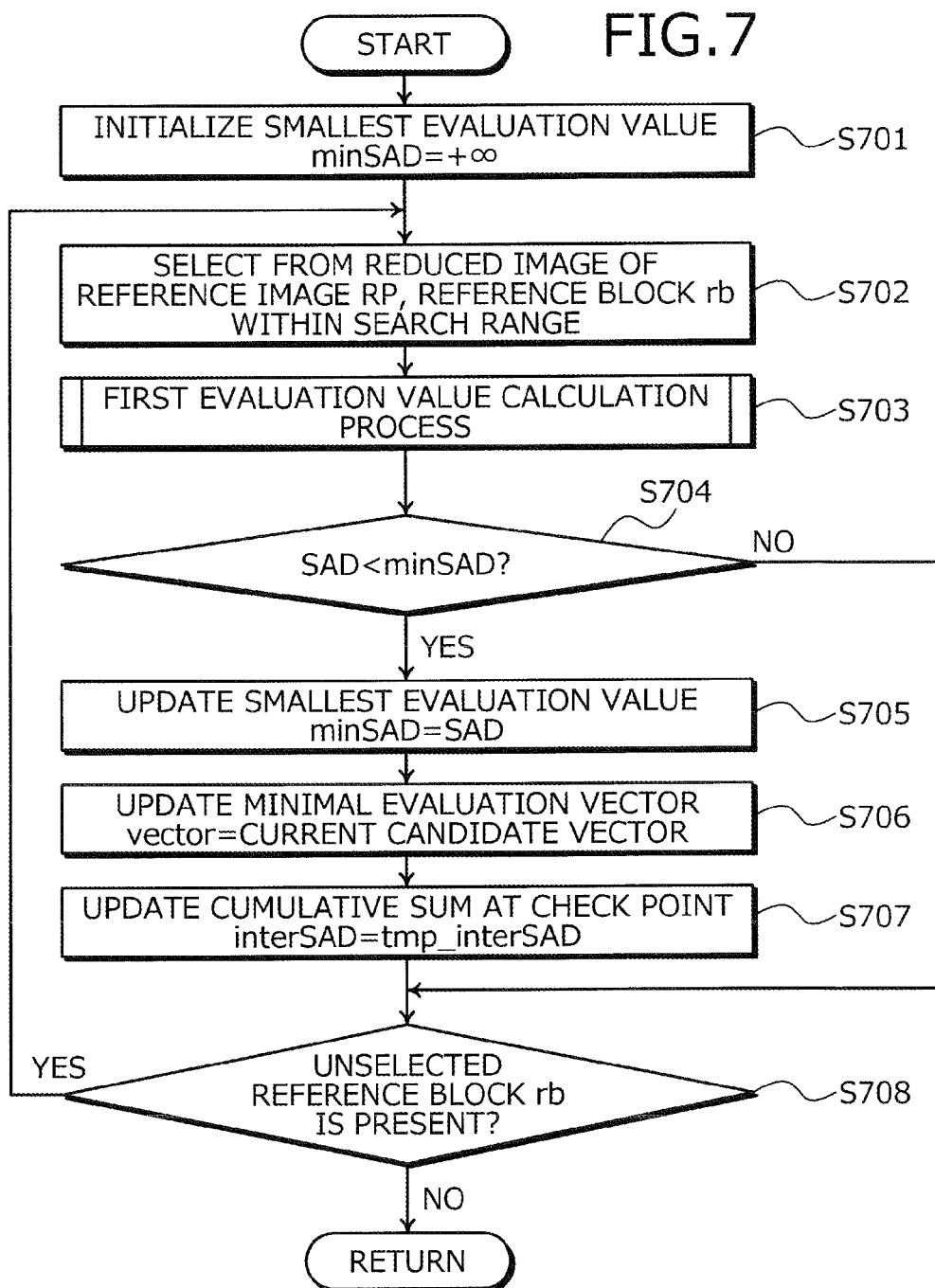
FIG. 7 is a flowchart of an example of details of a process procedure for a first smallest evaluation value calculation process.

FIG. 7 is a flowchart of an example of details of a process procedure for the first smallest evaluation value calculation process. In the flowchart of FIG. 7, the moving image processing apparatus 100 initializes the smallest evaluation value minSAD as "minSAD=+∞" (step S701).

The moving image processing apparatus 100 selects from the reduced image of the reference image RP, the reference block rb within the search range (step S702) and executes the first evaluation value calculation process of calculating the evaluation value SAD of the reference block rb (step S703). Details of a process procedure for the first evaluation value calculation process will be described later with reference to FIG. 8.

The moving image processing apparatus 100 determines whether the evaluation value SAD of the reference block rb is less than the smallest evaluation value minSAD (step S704). If the moving image processing apparatus 100 determines that the evaluation value SAD of the reference block rb is greater than or equal to the smallest evaluation value minSAD (step S704: NO), the moving image processing apparatus 100 progresses to the operation at step S708.

On the other hand, if the moving image processing apparatus 100 determines that the evaluation value SAD of the reference block rb is less than the smallest evaluation value minSAD (step S704: YES), the moving image processing apparatus 100 updates the smallest evaluation value minSAD to the evaluation value SAD of the reference block rb (step S705) and updates the minimal evaluation vector "vector" to the current candidate vector (step S706).

At a check point, the moving image processing apparatus 100 updates the cumulative sum interSAD to a cumulative sum tmp_interSAD (step S707). The "cumulative sum tmp_interSAD" will be described later with reference to FIG. 8. The moving image processing apparatus 100 determines whether a reference block rb within the search range is present that has not been selected from the reduced image of the reference image RP (step S708).

If the moving image processing apparatus 100 determines that an unselected reference block rb is present (step S708: YES), the moving image processing apparatus 100 returns to the operation at step S702, the moving image processing apparatus 100 selects from the reduced image of the reference image RP, an unselected reference block rb within the search range. On the other hand, if the moving image processing apparatus 100 determines that no unselected reference block rb is present (step S708: NO), the moving image processing apparatus 100 returns to the operation at the process step at which the moving image processing apparatus 100 invokes the first smallest evaluation value calculation process.

Thereby, the candidate vector of the reference block rb corresponding to the smallest evaluation value minSAD can be detected as the first motion vector V1. The cumulative sum can be recorded at the check point when the smallest evaluation value minSAD is calculated.

Details of a process procedure for the first evaluation value calculation operation at step S703 depicted in FIG. 7 will be described.

Figure 8:
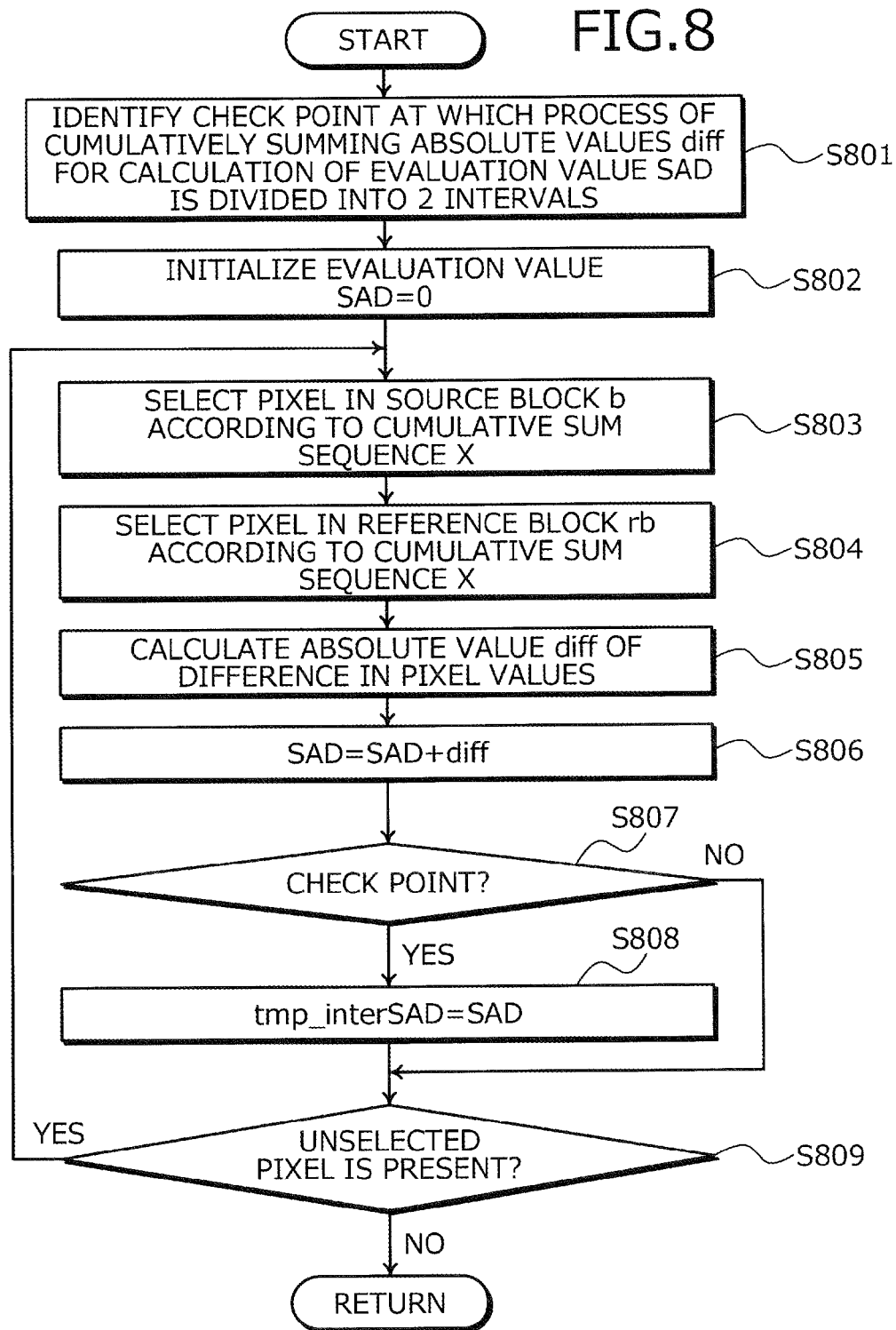
FIG. 8 is a flowchart of an example of details of a procedure for a first evaluation value calculation process.

FIG. 8 is a flowchart of an example of details of a procedure for the first evaluation value calculation process. In the flowchart of FIG. 8, the moving image processing apparatus 100 identifies the check point at which the process of calculating the cumulative sum of the absolute values diff for the calculation of the evaluation value SAD is divided into two intervals (step S801). The "check point" is identified based on, for example, the number of process steps (or the number of pixels).

The moving image processing apparatus 100 initializes the evaluation value SAD as "SAD=0" (step S802), selects a pixel in the source block b according to the cumulative sum sequence X (step S803), and selects a pixel in the reference block rb according to the cumulative sum sequence X (step S804).

The moving image processing apparatus 100 calculates the absolute value diff of the difference in the pixel value between the selected pixels (step S805), adds the absolute value diff to the evaluation value SAD (step S806), and determines whether the current number of process steps is the check point (step S807).

If the moving image processing apparatus 100 determines that the current number of process steps is not at the check point (step S807: NO), the moving image processing apparatus 100 progresses to the operation at step S809. On the other hand, if the moving image processing apparatus 100 determines that the current number of process steps is the check point (step S807: YES), the moving image processing apparatus 100 updates the cumulative sum tmp_interSAD to the evaluation value SAD (step S808).

The moving image processing apparatus 100 determines whether an unselected pixel is present that has not been selected from the source block b (step S809). If the moving image processing apparatus 100 determines that an unselected pixel is present (step S809: YES), the moving image processing apparatus 100 returns to the operation at step S803, the moving image processing apparatus 100 selects an unselected pixel in the source block b. On the other hand, if the moving image processing apparatus 100 determines that no unselected pixel is present (step S809: NO), the moving image processing apparatus 100 returns to the process at the process step at which the moving image processing apparatus 100 invokes the first evaluation value calculation process.

Thereby, the evaluation value SAD of each reference block rb can be calculated and the cumulative sum at the check point (the amount of increase of the absolute value diff in the interval S1) can be recorded when the evaluation value SAD is calculated.

A procedure for the second determination process of the moving image processing apparatus 100 will be described. The second determination process is a process of determining the cumulative sum sequence Y that is to be used in a case where the process of calculating the cumulative sum of the absolute values diff is divided into three intervals when the evaluation value SAD of the reference block rb is calculated.

Figure 9:
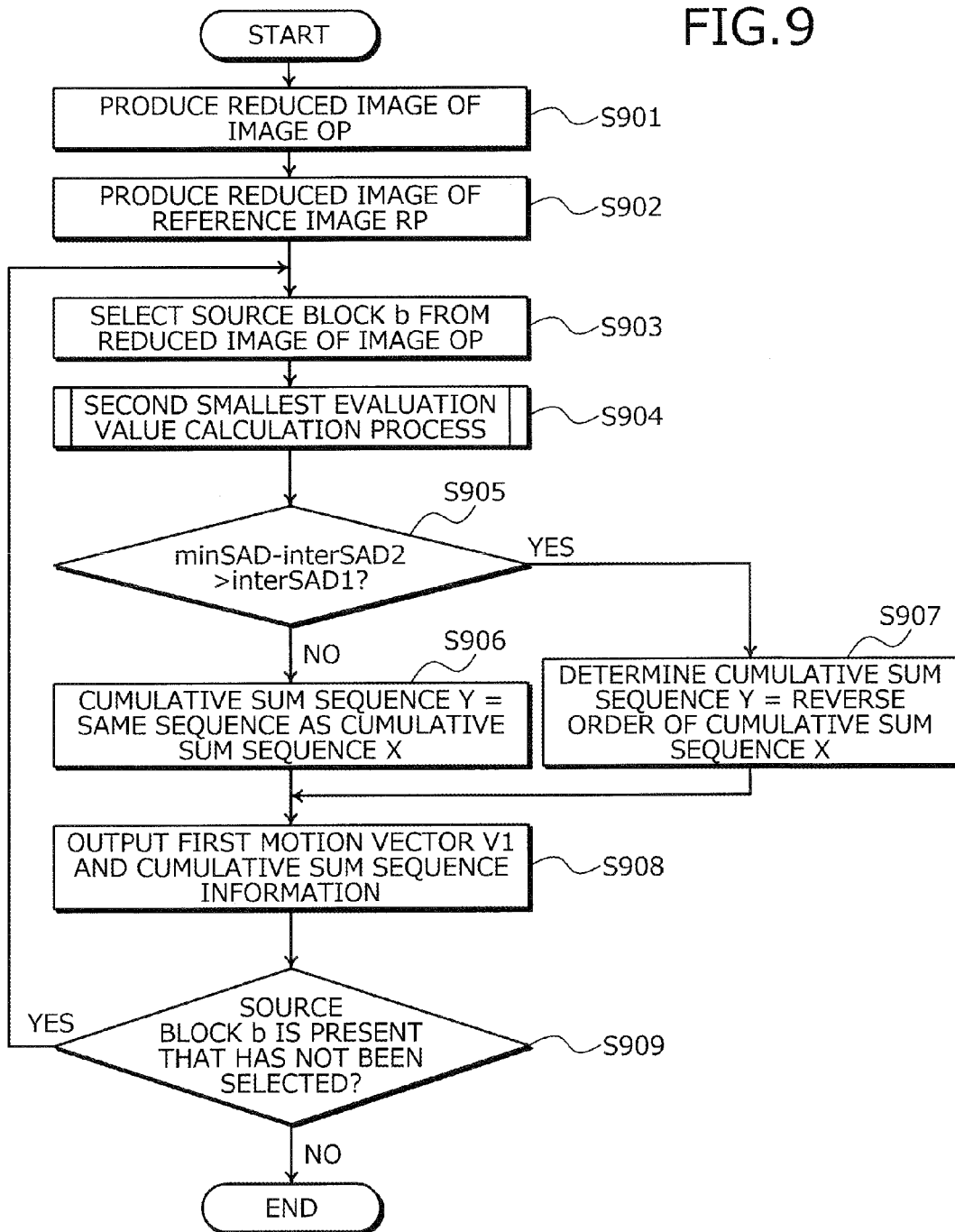
FIG. 9 is a flowchart of an example of a procedure for a second determination process.

FIG. 9 is a flowchart of an example of the procedure for the second determination process. In the flowchart of FIG. 9, the moving image processing apparatus 100 produces the reduced image of the image OP (step S901) and produces the reduced image of the reference image RP (step S902).

The moving image processing apparatus 100 selects the source block b from the reduced image of the image OP (step S903) and executes a first smallest evaluation value calculation process (step S904). The detailed process procedure for the first smallest evaluation value calculation process will be described later with reference to FIG. 10.

The moving image processing apparatus 100 determines whether "minSAD-interSAD 2" exceeds "interSAD1" (step S905). The "interSAD 2" is the cumulative sum of the absolute values diff at the time point at which a first check point described later is reached and corresponds to the amount of increase of the absolute value diff in the interval S1. The "interSAD 2" is the cumulative sum of the absolute values diff at the time point at which a second check point described later is reached and corresponds to a value obtained by adding the amount of increase of the absolute value diff of the interval S1 and that of the interval S2.

If the moving image processing apparatus 100 determines that "minSAD-interSAD 2" less than or equal to "interSAD 1" (step S905: NO), the moving image processing apparatus 100 determines that the cumulative sum sequence Y is the same sequence as the cumulative sum sequence X (step S906). On the other hand, if the moving image processing apparatus 100 determines that "minSAD-interSAD 2" exceeds "interSAD 1" (step S905: YES), the moving image processing apparatus 100 determines that the cumulative sum sequence Y is the reverse order of the cumulative sum sequence X (step S907).

The moving image processing apparatus 100 outputs the first motion vector V1 and cumulative sum sequence information, each being correlated with the source block b (step S908). The moving image processing apparatus 100 determines whether a source block b is present that has not been selected from the reduced image of the image OP (step S909).

If the moving image processing apparatus 100 determines that an unselected source block b is present (step S909: YES), the moving image processing apparatus 100 returns to the operation at step S903, and selects an unselected source block b from the reduced image of the image OP. On the other hand, if the moving image processing apparatus 100 determines that no unselected source block b is present (step S909: NO), the moving image processing apparatus 100 causes the series of process steps according to this flowchart to come to an end.

Thereby, when the amount of increase in the interval S1 is less than that in the interval S3 among the intervals S1 to S3 formed by dividing the process of calculating the cumulative sum of the absolute values diff into three intervals at the first stage motion detection process, it can be determined that the cumulative sum sequence Y is the reverse order of the cumulative sum sequence X. If the amount of increase in the interval S1 is greater than or equal to that in the interval S3, it can be determined that the cumulative sum sequence Y is the same sequence as the cumulative sum sequence X.

Details of a process procedure for the second smallest evaluation value calculation operation at step S904 depicted in FIG. 9 will be described.

Figure 10:
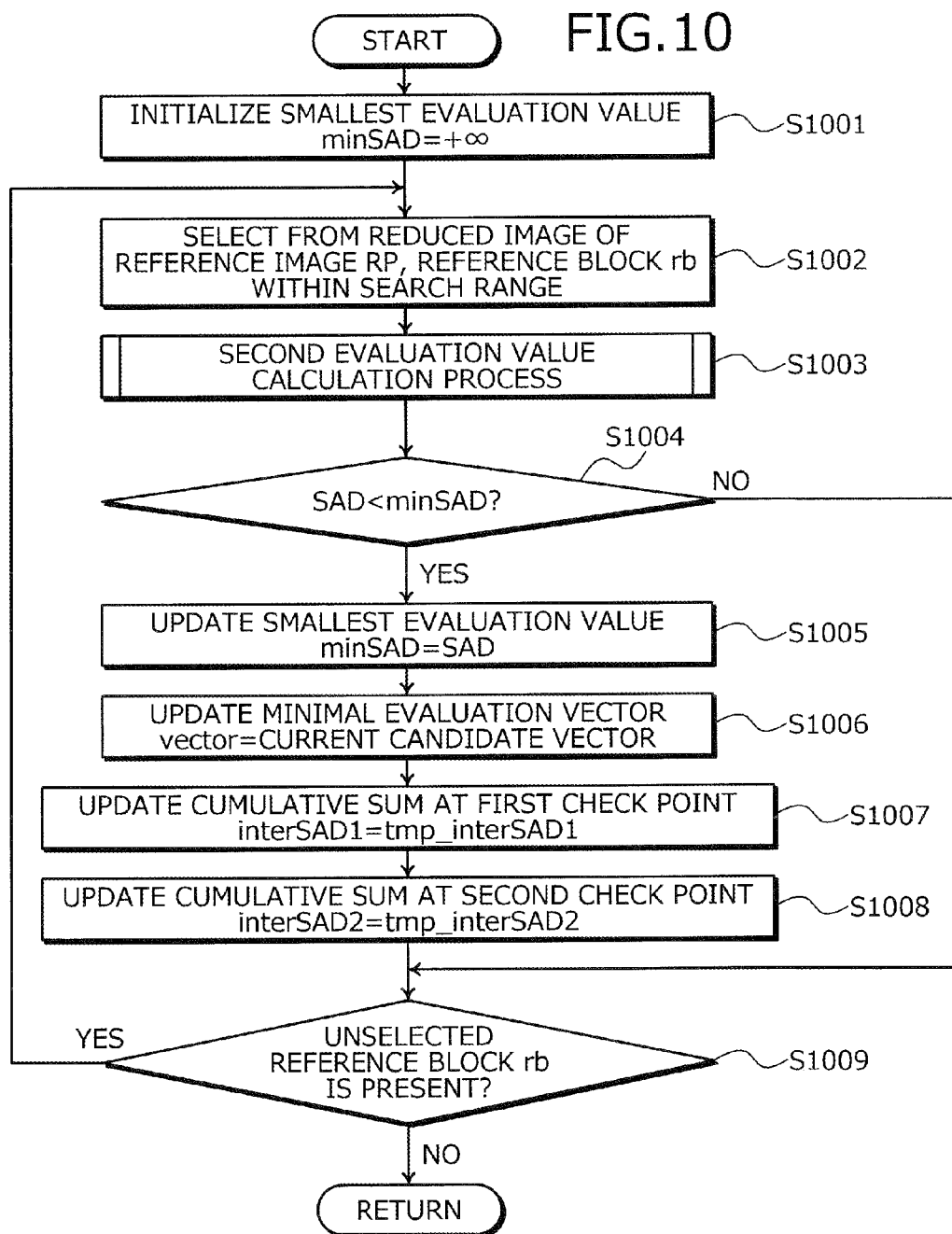
FIG. 10 is a flowchart of an example of details of a process procedure for a second smallest evaluation value calculation process.

FIG. 10 is a flowchart of an example of details of a process procedure for the second smallest evaluation value calculation process. In the flowchart of FIG. 10, the moving image processing apparatus 100 initializes the smallest evaluation value minSAD as "minSAD=+∞" (step S1001).

The moving image processing apparatus 100 selects from the reduced image of the reference image RP, the reference block rb within the search range (step S1002) and executes the first evaluation value calculation process of calculating the evaluation value SAD of the reference block rb (step S1003). Details of a process procedure for the second evaluation value calculation process will be described later with reference to FIG. 11.

The moving image processing apparatus 100 determines whether the evaluation value SAD of the reference block rb is less than the smallest evaluation value minSAD (step S1004). If the moving image processing apparatus 100 determines that the evaluation value SAD of the reference block rb is greater than or equal to the smallest evaluation value minSAD (step S1004: NO), the moving image processing apparatus 100 progresses to the operation at step S1009.

On the other hand, if the moving image processing apparatus 100 determines that the evaluation value SAD of the reference block rb is less than the smallest evaluation value minSAD (step S1004: YES), the moving image processing apparatus 100 updates the smallest evaluation value minSAD to the evaluation value SAD of the reference block rb (step S1005) and updates the minimal evaluation vector "vector" to the current candidate vector (step S1006).

The moving image processing apparatus 100 updates the cumulative sum interSAD 1 at the first check point to a cumulative sum tmp_interSAD 1 (step S1007) and updates the cumulative sum interSAD 2 at the second check point to a cumulative sum tmp_interSAD 2 (step S1008). The cumulative sums tmp_inter SAD 1 and 2 will be described later with reference to FIG. 11.

The moving image processing apparatus 100 determines whether a reference block rb within the search range is present that has not been selected from the reduced image of the reference image RP (step S1009). If the moving image processing apparatus 100 determines that an unselected reference block rb is present (step S1009: YES), the moving image processing apparatus 100 returns to the operation at step S1002, the moving image processing apparatus 100 selects from the reduced image of the reference image RP, an unselected reference block rb within the search range. On the other hand, if the moving image processing apparatus 100 determines that no unselected reference block rb is present (step S1009: NO), the moving image processing apparatus 100 returns to the operation at the process step at which the moving image processing apparatus 100 invokes the second smallest evaluation value calculation process.

Thereby, the candidate vector of the reference block rb corresponding to the smallest evaluation value minSAD can be detected as the first motion vector V1. The cumulative sum can be recorded at the first and the second check points when the smallest evaluation value minSAD is calculated.

Details of a process procedure for the second evaluation value calculation operation at step S1003 depicted in FIG. 10 will be described.

Figure 11:
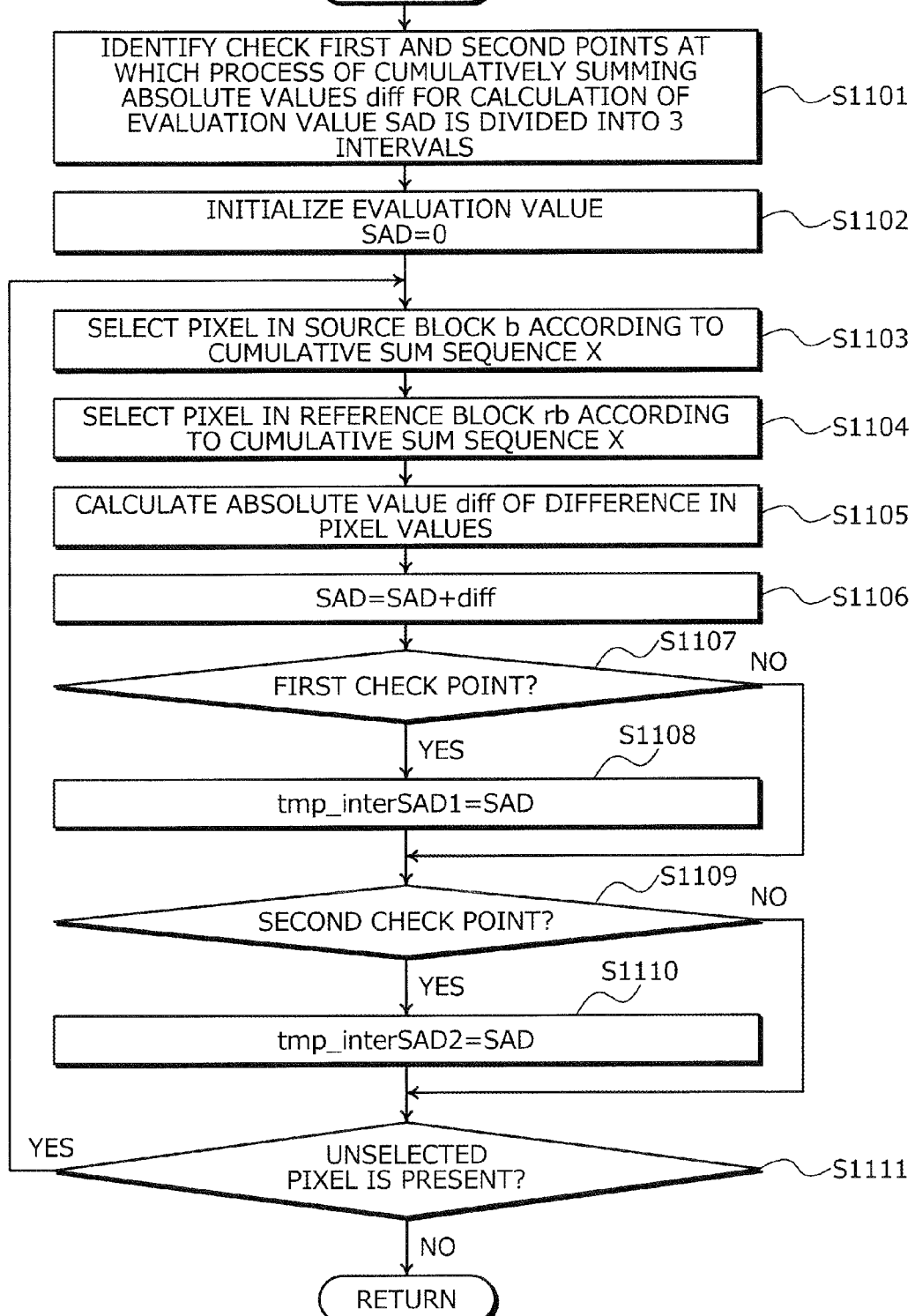
FIG. 11 is a flowchart of an example of details of a procedure for a second evaluation value calculation process.

FIG. 11 is a flowchart of an example of details of a procedure for the second evaluation value calculation process. In the flowchart of FIG. 11, the moving image processing apparatus 100 identifies the first and the second check points at which the process of calculating the cumulative sum of the absolute values diff for the calculation of the evaluation value SAD is divided into three intervals (step S1101).

The moving image processing apparatus 100 initializes the evaluation value SAD as "SAD=0" (step S1102), selects a pixel in the source block b according to the cumulative sum sequence X (step S1103), and selects a pixel in the reference block rb according to the cumulative sum sequence X (step S1104).

The moving image processing apparatus 100 calculates the absolute value diff of the difference in the pixel value between the selected pixels (step S1105), adds the absolute value diff to the evaluation value SAD (step S1106), and determines whether the current number of process steps is the first check point (step S1107).

If the moving image processing apparatus 100 determines that the current number of process steps is not at the first check point (step S1107: NO), the moving image processing apparatus 100 progresses to the operation at step S1109. On the other hand, if the moving image processing apparatus 100 determines that the current number of process steps is the first check point (step S1107: YES), the moving image processing apparatus 100 updates the cumulative sum tmp_interSAD 1 to the evaluation value SAD (step S1108).

The moving image processing apparatus 100 determines whether the current number of process steps is the second check point (step S1109). If the moving image processing apparatus 100 determines that the current number of process steps is not the second check point (step S1109: NO), the moving image processing apparatus 100 progresses to the operation at step S1111. On the other hand, if the moving image processing apparatus 100 determines that the current number of process steps is the second check point (step S1109: YES), the moving image processing apparatus 100 updates the cumulative sum tmp_inter SAD 2 to the evaluation value SAD (step S1110).

The moving image processing apparatus 100 determines whether an unselected pixel is present that is has not been selected from the source block b (step S1111). If the moving image processing apparatus 100 determines that an unselected pixel is present (step S1111: YES), the moving image processing apparatus 100 returns to the operation at step S1103, the moving image processing apparatus 100 selects an unselected pixel in the source block b. On the other hand, if the moving image processing apparatus 100 determines that no unselected pixel is present (step S1111: NO), the moving image processing apparatus 100 returns to the process at the process step at which the moving image processing apparatus 100 invokes the second evaluation value calculation process.

Thereby, the evaluation value SAD can be calculated for each reference block rb and the cumulative sums at the first and the second check points for the calculation of the evaluation value SAD can be recorded.

A procedure for the third determination process of the moving image processing apparatus 100 will be described. The third determination process is a process of determining the cumulative sum sequence Y that is to be used in a case where the process of calculating the cumulative sum of the absolute values diff is divided into n intervals when the evaluation value SAD of the reference block rb is calculated.

Figure 12:
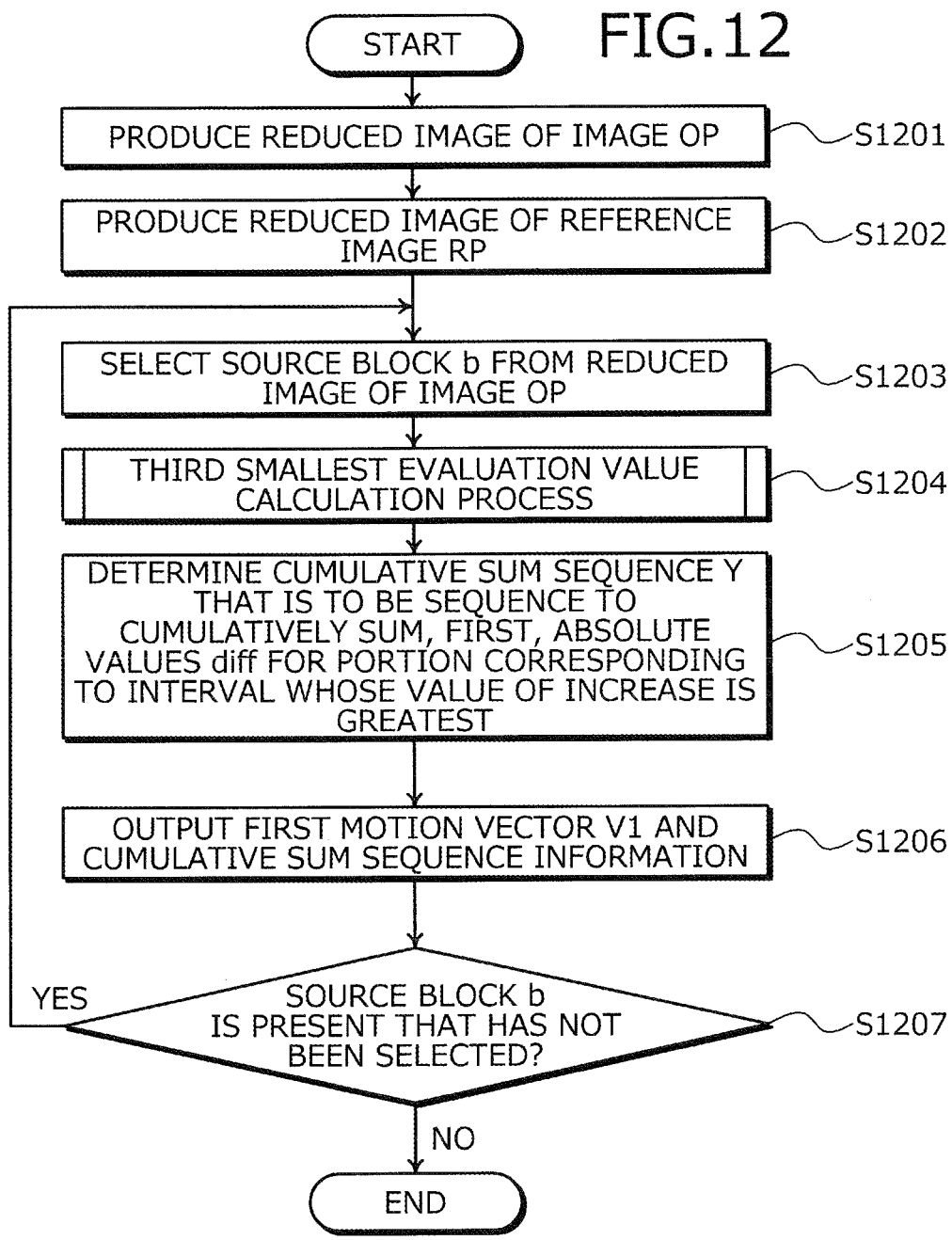
FIG. 12 is a flowchart of an example of a procedure for a third determination process.

FIG. 12 is a flowchart of an example of the procedure for the third determination process. In the flowchart of FIG. 12, the moving image processing apparatus 100 produces the reduced image of the image OP (step S1201) and produces the reduced image of the reference image RP (step S1202).

The moving image processing apparatus 100 selects the source block b from the reduced image of the image OP (step S1203) and executes a third smallest evaluation value calculation process (step S1204). The detailed process procedure for the third smallest evaluation value calculation process will be described later with reference to FIG. 13.

The moving image processing apparatus 100 determines the cumulative sum sequence Y that is to be the sequence to cumulatively sum first the absolute values diff for the portion corresponding to the interval whose value of the increase is the greatest (step S1205). The moving image processing apparatus 100 outputs the first motion vector V1 and cumulative sum sequence information, each being correlated with the source block b (step S1206).

The moving image processing apparatus 100 determines whether a source block b is present that has not been selected from the reduced image of the image OP (step S1207). If the moving image processing apparatus 100 determines that an unselected source block b is present (step S1207: YES), the moving image processing apparatus 100 returns to the operation at step S1203, and selects an unselected source block b from the reduced image of the image OP. On the other hand, if the moving image processing apparatus 100 determines that no unselected source block b is present (step S1207: NO), the moving image processing apparatus 100 causes the series of process steps according to this flowchart to come to an end.

Thereby, it can be determined that the cumulative sum sequence Y is the sequence to cumulatively sum first the portion corresponding to the maximal increase interval whose value of increase is the greatest among the intervals S1 to Sn formed by dividing into the n intervals, the process of calculating the cumulative sum of the absolute values diff at the first stage motion detection process.

Details of a process procedure for the third smallest evaluation value calculation operation at step S1204 depicted in FIG. 12 will be described.

Figure 13:
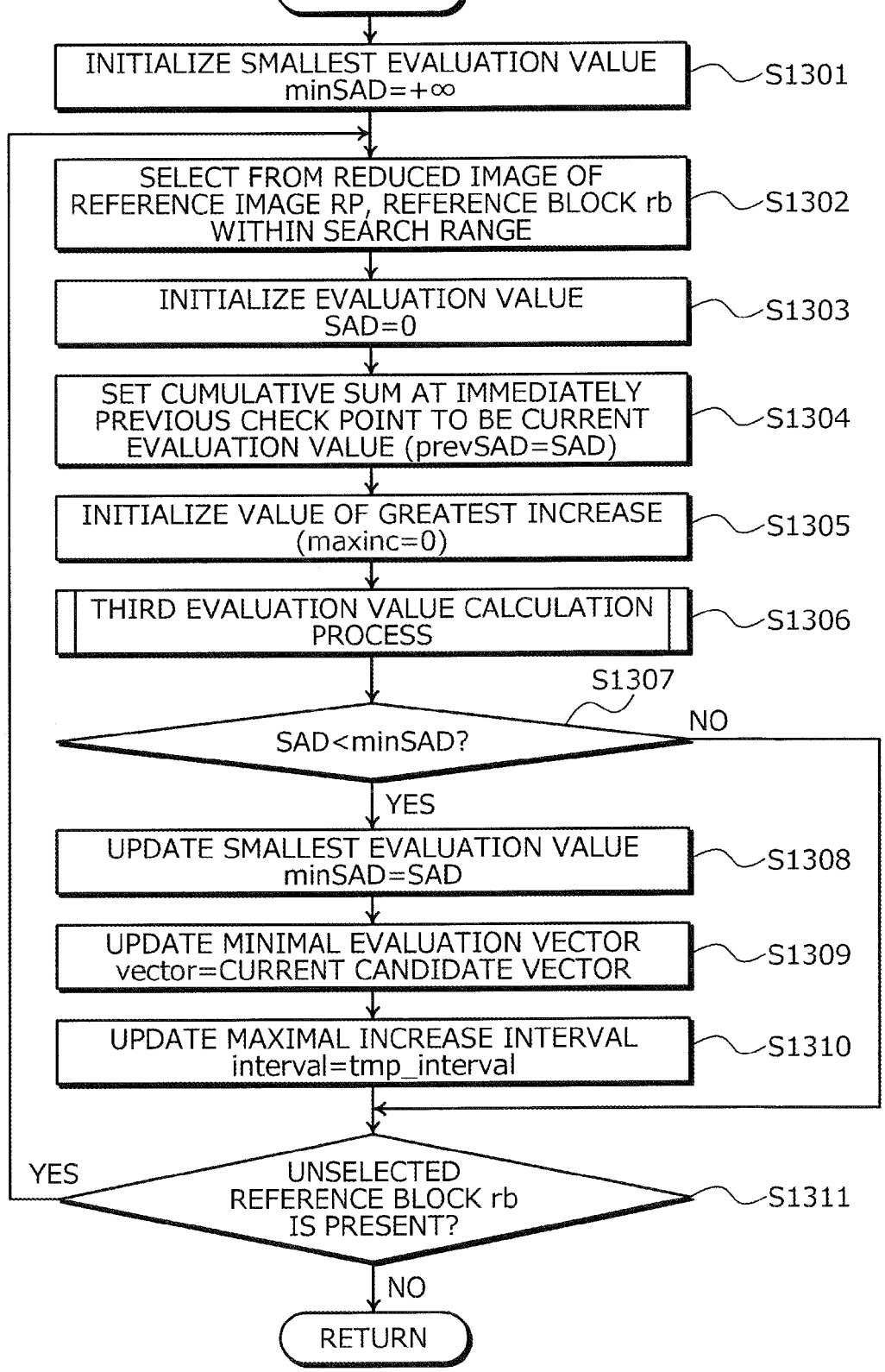
FIG. 13 is a flowchart of an example of details of a process procedure for a third smallest evaluation value calculation process.

FIG. 13 is a flowchart of an example of details of a process procedure for the third smallest evaluation value calculation process. In the flowchart of FIG. 13, the moving image processing apparatus 100 initializes the smallest evaluation value minSAD as "minSAD=+∞" (step S1301).

The moving image processing apparatus 100 selects a reference block rb within the search range from the reduced image of the reference image RP (step S1302), initializes the evaluation value SAD as "SAD=0" (step S1303), and sets the cumulative sum at the immediately previous check point to be the current evaluation value (step S1304).

The moving image processing apparatus 100 initializes the value of the greatest increase "maxinc" as "maxinc=0" (step S1305) and executes the third evaluation value calculation process of calculating the evaluation value SAD of the reference block rb (step S1306). Details of a process procedure for the third evaluation value calculation process will be described later with reference to FIG. 14.

The moving image processing apparatus 100 determines whether the evaluation value SAD of the reference block rb is less than the smallest evaluation value minSAD (step S1307). If the moving image processing apparatus 100 determines that the evaluation value SAD of the reference block rb is greater than or equal to the smallest evaluation value minSAD (step S1307: NO), the moving image processing apparatus 100 progresses to the operation at step S1311.

On the other hand, if the moving image processing apparatus 100 determines that the evaluation value SAD of the reference block rb is less than the smallest evaluation value minSAD (step S1307: YES), the moving image processing apparatus 100 updates the smallest evaluation value minSAD to the evaluation value SAD of the reference block rb (step S1308) and updates the minimal evaluation vector "vector" to the current candidate vector (step S1309).

The moving image processing apparatus 100 updates the maximal increase interval "interval" to an interval tmp_interval (step S1310). The maximal increase interval "interval" and the interval "tmp_interval" will be described later with reference to FIG. 14. The moving image processing apparatus 100 determines whether a reference bock rb within the search range is present that has not been selected from the reduced image of the reference image RP (step S1311).

If the moving image processing apparatus 100 determines that an unselected reference block rb is present (step S1311: YES), the moving image processing apparatus 100 returns to the operation at step S1302, the moving image processing apparatus 100 selects from the reduced image of the reference image RP, an unselected reference block rb within the search range. On the other hand, if the moving image processing apparatus 100 determines that no unselected reference block rb is present (step S1311: NO), the moving image processing apparatus 100 returns to the operation at the process step at which the moving image processing apparatus 100 invokes the third smallest evaluation value calculation process.

Thereby, the candidate vector of the reference block rb corresponding to the smallest evaluation value minSAD can be detected as the first motion vector V1. The maximal increase interval can be recorded when the smallest evaluation value minSAD is calculated.

Details of a process procedure for the third evaluation value calculation operation at step S1306 depicted in FIG. 13 will be described.

Figure 14:
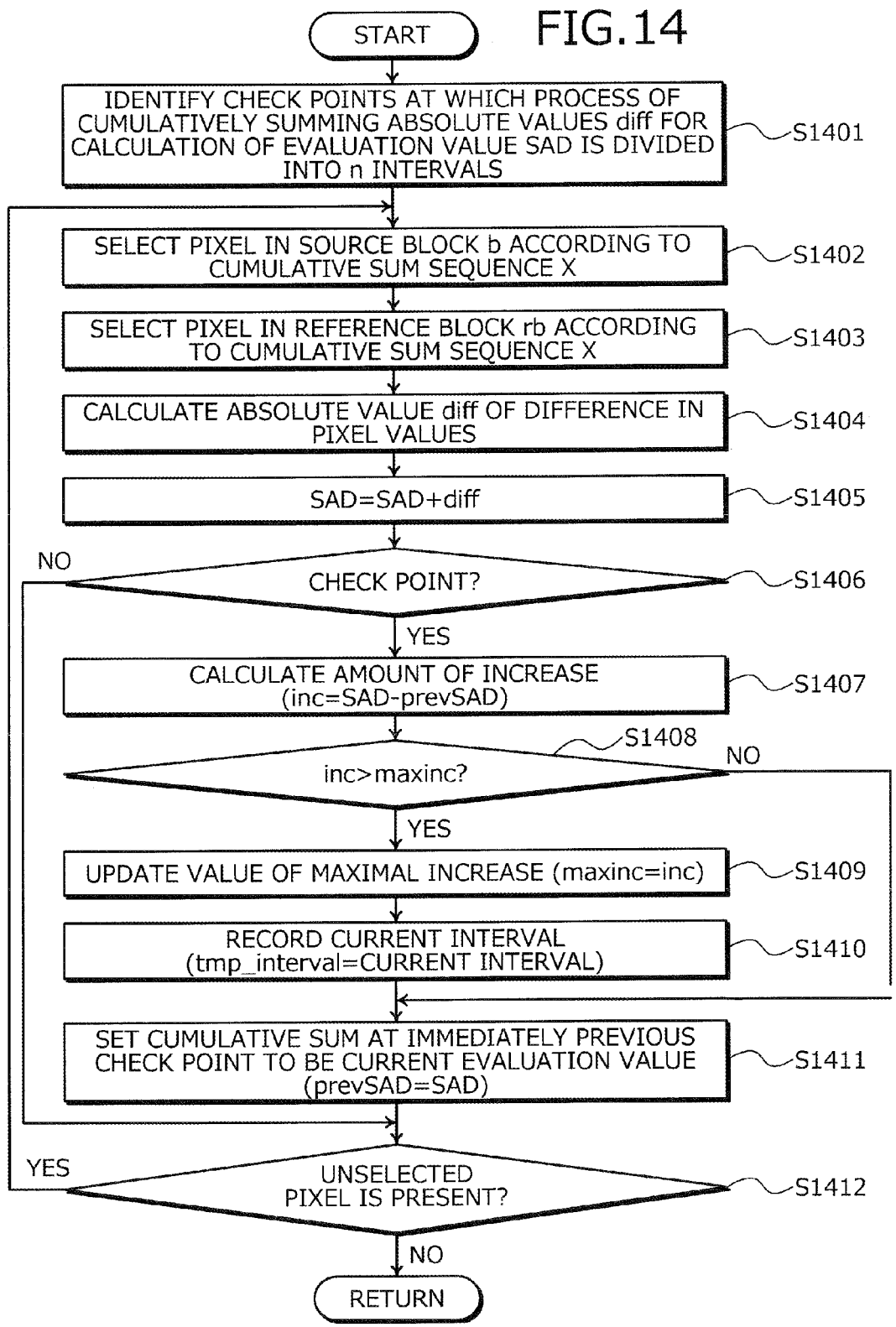
FIG. 14 is a flowchart of an example of details of a procedure for a third evaluation value calculation process.

FIG. 14 is a flowchart of an example of details of a procedure for the third evaluation value calculation process. In the flowchart of FIG. 14, the moving image processing apparatus 100 identifies the check point at which the process of calculating the cumulative sum of the absolute values diff for the calculation of the evaluation value SAD is divided into n intervals (step S1401).

The moving image processing apparatus 100 selects a pixel in the source block b according to the cumulative sum sequence X (step S1402), and selects a pixel in the reference block rb according to the cumulative sum sequence X (step S1403).

The moving image processing apparatus 100 calculates the absolute value diff of the difference in the pixel value between the selected pixels (step S1404), adds the absolute value diff to the evaluation value SAD (step S1405), and determines whether the current number of process steps is the check point (step S1406).

If the moving image processing apparatus 100 determines that the current number of process steps is not the check point (step S1406: NO), the moving image processing apparatus 100 progresses to the operation at step S1412. On the other hand, if the moving image processing apparatus 100 determines that the current number of process steps is the check point (step S1406: YES), the moving image processing apparatus 100 calculates the amount of increase "inc" by subtracting the current evaluation value prevSAD from the evaluation value SAD (step S1407).

The moving image processing apparatus 100 determines whether the amount of increase "inc" exceeds the value of the maximal increase "maxinc" (step S1408). If the moving image processing apparatus 100 determines that the amount of increase "inc" is less than or equal to the value of the maximal increase "maxinc" (step S1408: NO), the moving image processing apparatus 100 progresses to the operation at step S1411.

On the other hand, if the moving image processing apparatus 100 determines that the amount of increase "inc" exceeds the value of the maximal increase "maxinc" (step S1408: YES), the moving image processing apparatus 100 updates the value of the maximal increase "maxinc" to the amount of increase "inc" (step S1409) and records the current interval as the interval tmp_interval (step S1410).

The moving image processing apparatus 100 sets the cumulative sum at the immediately previous check point to be the current evaluation value "prevSAD" (step S1411) and determines whether an unselected pixel is present that has not been selected from the source block b (step S1412).

If the moving image processing apparatus 100 determines that an unselected pixel is present (step S1412: YES), the moving image processing apparatus 100 returns to the operation at step S1402 and selects an unselected pixel in the source block b. On the other hand, if the moving image processing apparatus 100 determines that no unselected pixel is present (step S1412: NO), the moving image processing apparatus 100 returns to the process step at which the moving image processing apparatus 100 invokes the third evaluation value calculation process.

Thereby, the evaluation value SAD can be calculated for each reference block rb and the maximal increase interval obtained when the evaluation value SAD is calculated can be recorded.

A procedure for the fourth determination process of the moving image processing apparatus 100 will be described. The fourth determination process is a process of determining the cumulative sum sequence Y that is to be used in a case where the process of calculating the cumulative sum of the absolute values diff is divided into n intervals when the evaluation value SAD of the reference block rb is calculated.

Figure 15:
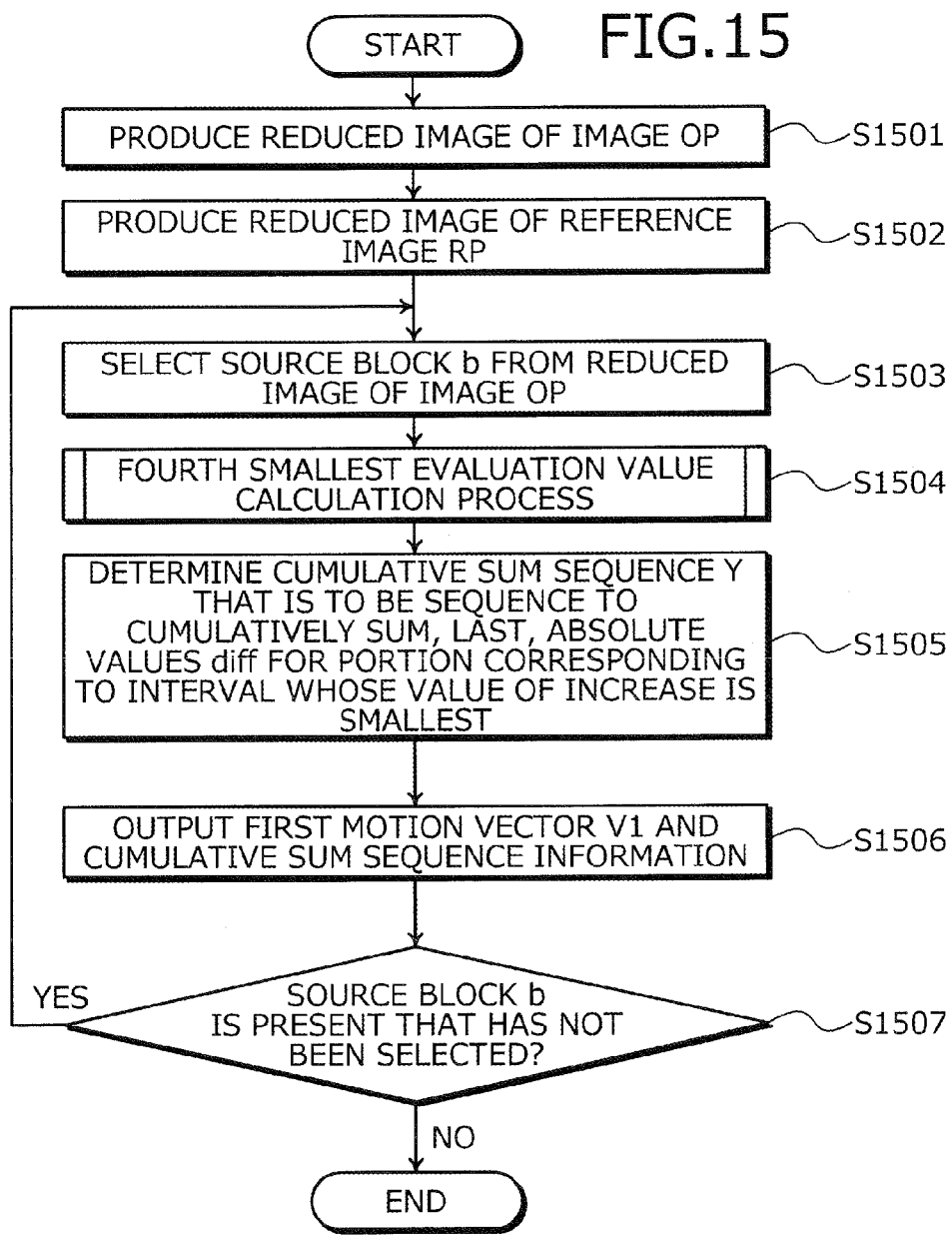
FIG. 15 is a flowchart of an example of a procedure for a fourth determination process.

FIG. 15 is a flowchart of an example of the procedure for the fourth determination process. In the flowchart of FIG. 15, the moving image processing apparatus 100 produces the reduced image of the image OP (step S1501) and produces the reduced image of the reference image RP (step S1502).

The moving image processing apparatus 100 selects the source block b from the reduced image of the image OP (step S1503) and executes a fourth smallest evaluation value calculation process (step S1504). The detailed process procedure for the fourth smallest evaluation value calculation process will be described later with reference to FIG. 16.

The moving image processing apparatus 100 determines the cumulative sum sequence Y that is to be the sequence to cumulatively sum last the absolute values diff for the portion corresponding to the interval whose value of the increase is the smallest (step S1505). The moving image processing apparatus 100 outputs the first motion vector V1 and cumulative sum sequence information, each being correlated with the source block b (step S1506).

The moving image processing apparatus 100 determines whether a source block b is present that has not been selected from the reduced image of the image OP (step S1507). If the moving image processing apparatus 100 determines that an unselected source block b is present (step S1507: YES), the moving image processing apparatus 100 returns to the operation at step S1503, and selects an unselected source block b from the reduced image of the image OP. On the other hand, if the moving image processing apparatus 100 determines that no unselected source block b is present (step S1507: NO), the moving image processing apparatus 100 causes the series of process steps according to this flowchart to come to an end.

Thereby, it can be determined that the cumulative sum sequence Y is the sequence to cumulatively sum last the portion corresponding to the minimal increase interval whose value of increase is the smallest among the intervals S1 to Sn formed by dividing into the n intervals, the process of calculating the cumulative sum of the absolute values diff at the first stage motion detection process.

Details of a process procedure for the fourth smallest evaluation value calculation operation at step S1504 depicted in FIG. 15 will be described.

Figure 16:
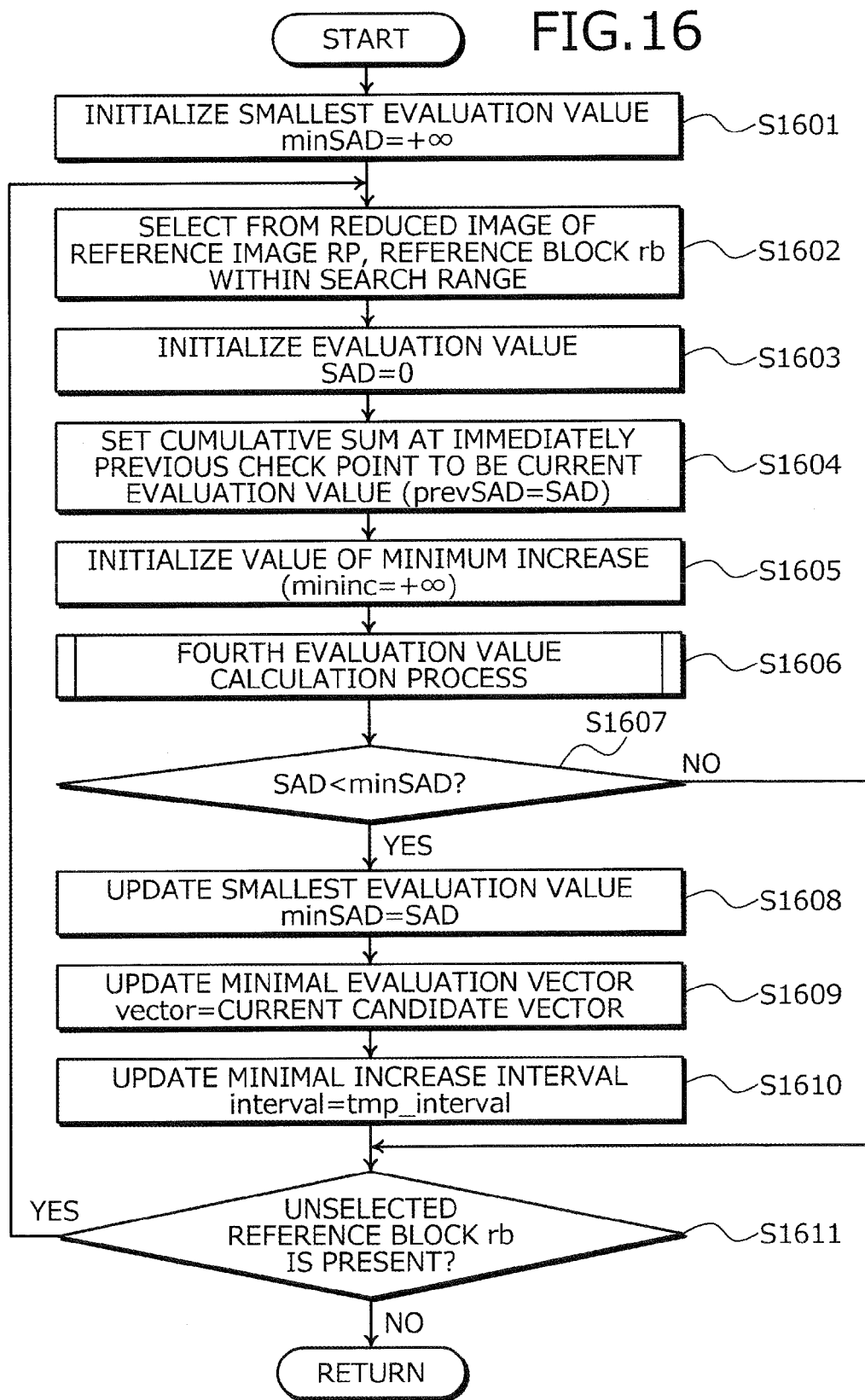
FIG. 16 is a flowchart of an example of details of a process procedure for a fourth smallest evaluation value calculation process.

FIG. 16 is a flowchart of an example of details of a process procedure for the fourth smallest evaluation value calculation process. In the flowchart of FIG. 16, the moving image processing apparatus 100 initializes the smallest evaluation value minSAD as "minSAD=+∞" (step S1601).

The moving image processing apparatus 100 selects a reference block rb within the search range from the reduced image of the reference image RP (step S1602), initializes the evaluation value SAD as "SAD=0" (step S1603), and sets the cumulative sum at the immediately previous check point to be the current evaluation value (step S1604).

The moving image processing apparatus 100 initializes the value of the minimum increase "mininc" as "mininc=0" (step S1605) and executes the fourth evaluation value calculation process of calculating the evaluation value SAD of the reference block rb (step S1606). Details of a process procedure for the fourth evaluation value calculation process will be described later with reference to FIG. 17.

The moving image processing apparatus 100 determines whether the evaluation value SAD of the reference block rb is less than the smallest evaluation value minSAD (step S1607). If the moving image processing apparatus 100 determines that the evaluation value SAD of the reference block rb is greater than or equal to the smallest evaluation value minSAD (step S1607: NO), the moving image processing apparatus 100 progresses to the operation at step S1611.

On the other hand, if the moving image processing apparatus 100 determines that the evaluation value SAD of the reference block rb is less than the smallest evaluation value minSAD (step S1607: YES), the moving image processing apparatus 100 updates the smallest evaluation value minSAD to the evaluation value SAD of the reference block rb (step S1608) and updates the minimal evaluation vector "vector" to the current candidate vector (step S1609).

The moving image processing apparatus 100 updates the minimal increase interval "interval" to an interval tmp_interval (step S1610). The minimal increase interval "interval"

and the interval "tmp_interval" will be described later with reference to FIG. 17. The moving image processing apparatus 100 determines whether a reference bock rb within the search range is present that has not been selected from the reduced image of the reference image RP (step S1611).

If the moving image processing apparatus 100 determines that an unselected reference block rb is present (step S1611: YES), the moving image processing apparatus 100 returns to the operation at step S1602, the moving image processing apparatus 100 selects from the reduced image of the reference image RP, an unselected reference block rb within the search range. On the other hand, if the moving image processing apparatus 100 determines that no unselected reference block rb is present (step S1611: NO), the moving image processing apparatus 100 returns to the operation at the process step at which the moving image processing apparatus 100 invokes the fourth smallest evaluation value calculation process.

Thereby, the candidate vector of the reference block rb corresponding to the smallest evaluation value minSAD can be detected as the first motion vector V1. The minimal increase interval can be recorded when the smallest evaluation value minSAD is calculated.

Details of a process procedure for the fourth evaluation value calculation operation at step S1606 depicted in FIG. 16 will be described.

Figure 17:
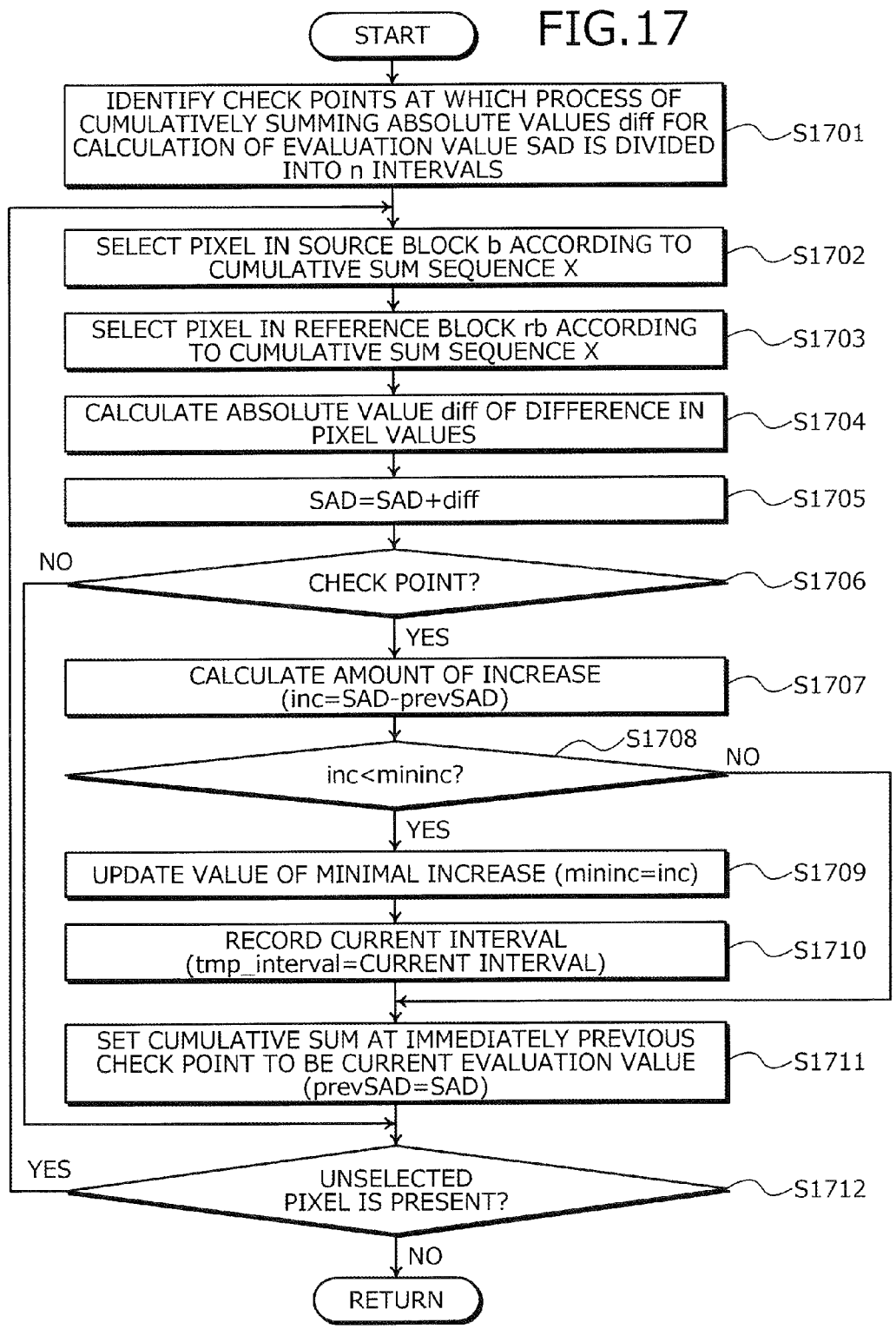
FIG. 17 is a flowchart of an example of details of a procedure for a fourth evaluation value calculation process.

FIG. 17 is a flowchart of an example of details of a procedure for the fourth evaluation value calculation process. In the flowchart of FIG. 17, the moving image processing apparatus 100 identifies the check point at which the process of calculating the cumulative sum of the absolute values diff for the calculation of the evaluation value SAD is divided into n intervals (step S1701).

The moving image processing apparatus 100 selects a pixel in the source block b according to the cumulative sum sequence X (step S1702), and selects a pixel in the reference block rb according to the cumulative sum sequence X (step S1703).

The moving image processing apparatus 100 calculates the absolute value diff of the difference in the pixel value between the selected pixels (step S1704), adds the absolute value diff to the evaluation value SAD (step S1705), and determines whether the current number of process steps is the check point (step S1706).

If the moving image processing apparatus 100 determines that the current number of process steps is not the check point (step S1706: NO), the moving image processing apparatus 100 progresses to the operation at step S1712. On the other hand, if the moving image processing apparatus 100 determines that the current number of process steps is the check point (step S1706: YES), the moving image processing apparatus 100 calculates the amount of increase "inc" by subtracting the current evaluation value prevSAD from the evaluation value SAD (step S1707).

The moving image processing apparatus 100 determines whether the amount of increase "inc" is less than the value of the minimal increase "mininc" (step S1708). If the moving image processing apparatus 100 determines that the amount of increase "inc" is greater than or equal to the value of the minimal increase "mininc" (step S1708: NO), the moving image processing apparatus 100 progresses to the operation at step S1711.

On the other hand, if the moving image processing apparatus 100 determines that the amount of increase "inc" is less than the value of the minimal increase "mininc" (step S1708: YES), the moving image processing apparatus 100 updates the value of the minimal increase "mininc" to the amount of increase "inc" (step S1709) and records the current interval as the interval tmp_interval (step S1710).

The moving image processing apparatus 100 sets the cumulative sum at the immediately previous check point to be the current evaluation value "prevSAD" (step S1711) and determines whether an unselected pixel is present that has not been selected from the source block b (step S1712).

If the moving image processing apparatus 100 determines that an unselected pixel is present (step S1712: YES), the moving image processing apparatus 100 returns to the operation at step S1702 and selects an unselected pixel in the source block b. On the other hand, if the moving image processing apparatus 100 determines that no unselected pixel is present (step S1712: NO), the moving image processing apparatus 100 returns to the process step at which the moving image processing apparatus 100 invokes the fourth evaluation value calculation process.

Thereby, the evaluation value SAD can be calculated for each reference block rb and the minimal increase interval obtained when the evaluation value SAD is calculated can be recorded.

A procedure for the fifth determination process of the moving image processing apparatus 100 will be described. The fifth determination process is a process of determining the cumulative sum sequence Y that is to be used in a case where the process of calculating the cumulative sum of the absolute values diff is divided into n intervals when the evaluation value SAD of the reference block rb is calculated.

Figure 18:
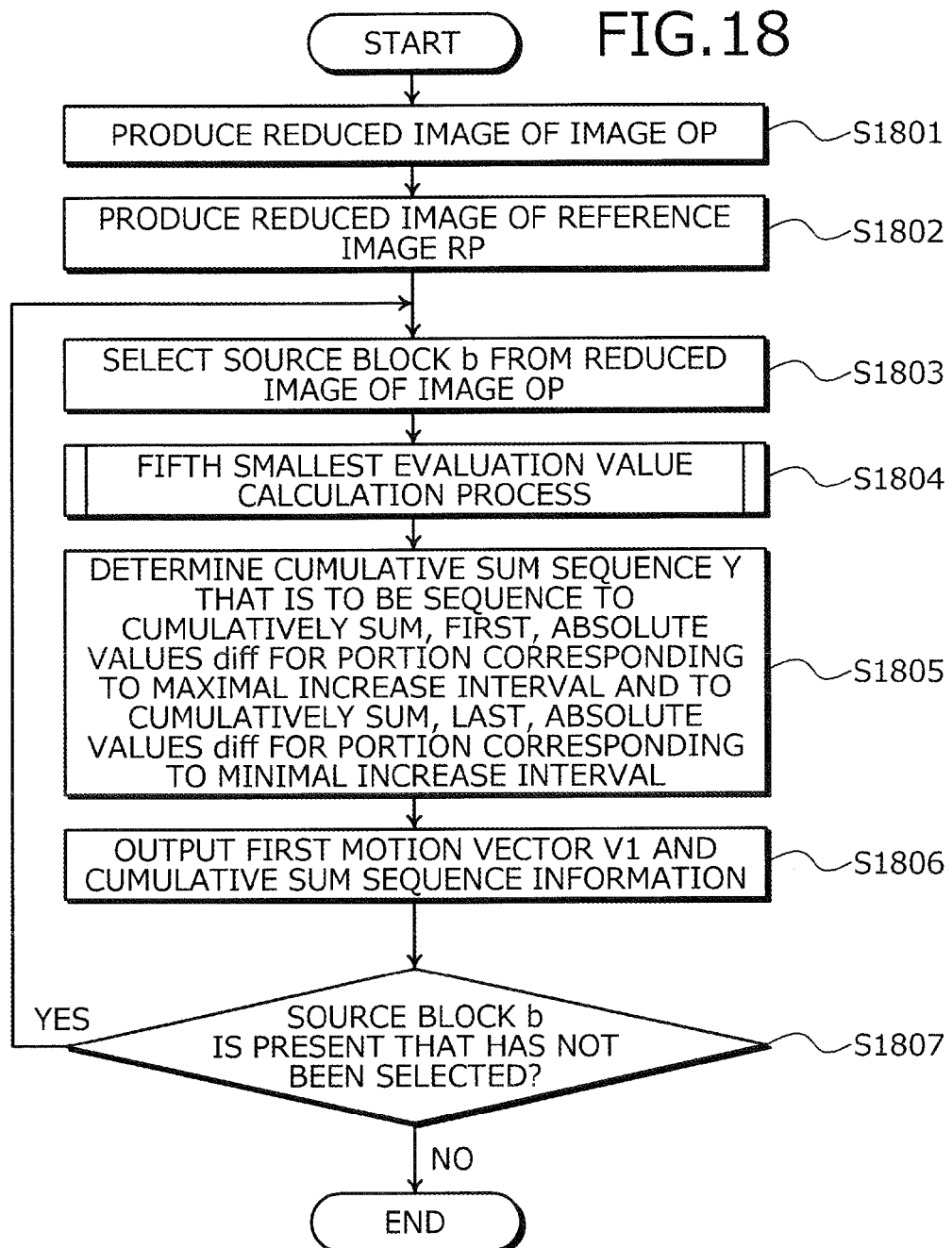
FIG. 18 is a flowchart of an example of a procedure for a fifth determination process.

FIG. 18 is a flowchart of an example of the procedure for the fifth determination process. In the flowchart of FIG. 18, the moving image processing apparatus 100 produces the reduced image of the image OP (step S1801) and produces the reduced image of the reference image RP (step S1802).

The moving image processing apparatus 100 selects the source block b from the reduced image of the image OP (step S1803) and executes a fifth smallest evaluation value calculation process (step S1804). The detailed process procedure for the fifth smallest evaluation value calculation process will be described later with reference to FIG. 19.

The moving image processing apparatus 100 determines the cumulative sum sequence Y that is to be the sequence to cumulatively sum first the absolute values diff for the portion corresponding to the maximal increase interval and to cumulatively sum last the absolute values diff for the portion corresponding to the minimal increase interval (step S1805). The moving image processing apparatus 100 outputs the first motion vector V1 and cumulative sum sequence information, each being correlated with the source block b (step S1806).

The moving image processing apparatus 100 determines whether a source block b is present that has not been selected from the reduced image of the image OP (step S1807). If the moving image processing apparatus 100 determines that an unselected source block b is present (step S1807: YES), the moving image processing apparatus 100 returns to the operation at step S1803, and selects an unselected source block b from the reduced image of the image OP. On the other hand, if the moving image processing apparatus 100 determines that no unselected source block b is present (step S1807: NO), the moving image processing apparatus 100 causes the series of process steps according to this flowchart to come to an end.

Thereby, it can be determined that the cumulative sum sequence Y is the sequence to cumulatively sum first the portion corresponding to the maximal increase interval whose value of increase is the greatest and to cumulatively sum last the portion corresponding to the minimal increase interval whose value of increase is the smallest among the intervals S1 to Sn.

Details of a process procedure for the fifth smallest evaluation value calculation operation at step S1804 depicted in FIG. 18 will be described.

Figure 19:
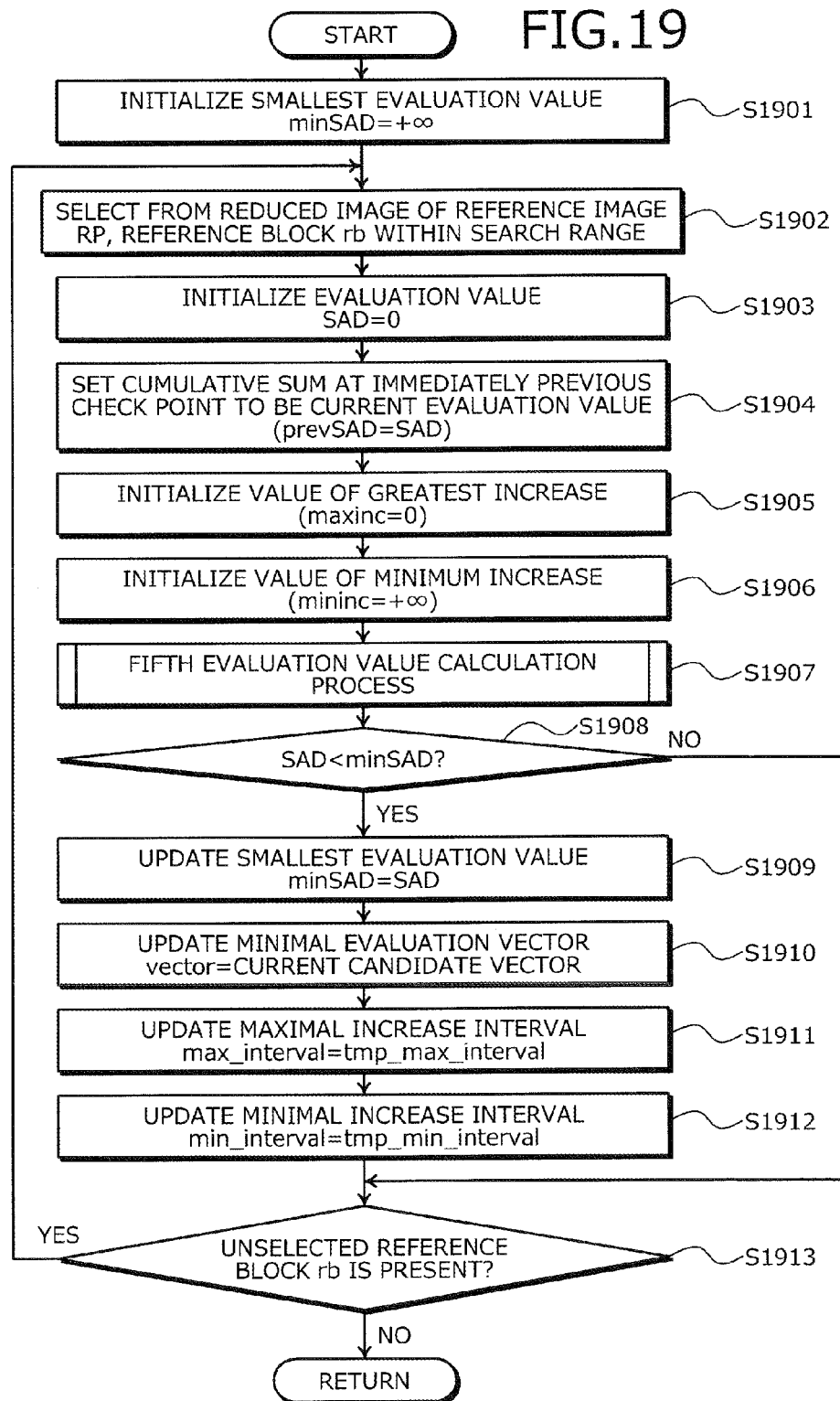
FIG. 19 is a flowchart of an example of details of a process procedure for a fifth smallest evaluation value calculation process.

FIG. 19 is a flowchart of an example of details of a process procedure for the fifth smallest evaluation value calculation process. In the flowchart of FIG. 19, the moving image processing apparatus 100 initializes the smallest evaluation value minSAD as "minSAD=+∞" (step S1901).

The moving image processing apparatus 100 selects a reference block rb within the search range from the reduced image of the reference image RP (step S1902), initializes the evaluation value SAD as "SAD=0" (step S1903), and sets the cumulative sum at the immediately previous check point to be the current evaluation value (step S1904).

The moving image processing apparatus 100 initializes the value of the greatest increase "maxinc" as "maxinc=0" (step S1905). The moving image processing apparatus 100 initializes the value of the minimum increase "mininc" as "mininc=0" (step S1906) and executes the fifth evaluation value calculation process of calculating the evaluation value SAD of the reference block rb (step S1907). Details of a process procedure for the fifth evaluation value calculation process will be described later with reference to FIG. 20.

The moving image processing apparatus 100 determines whether the evaluation value SAD of the reference block rb is less than the smallest evaluation value minSAD (step S1908). If the moving image processing apparatus 100 determines that the evaluation value SAD of the reference block rb is greater than or equal to the smallest evaluation value minSAD (step S1908: NO), the moving image processing apparatus 100 progresses to the operation at step S1913.

On the other hand, if the moving image processing apparatus 100 determines that the evaluation value SAD of the reference block rb is less than the smallest evaluation value minSAD (step S1908: YES), the moving image processing apparatus 100 updates the smallest evaluation value minSAD to the evaluation value SAD of the reference block rb (step S1909) and updates the minimal evaluation vector "vector" to the current candidate vector (step S1910).

The moving image processing apparatus 100 updates the maximal increase interval max_interval to the interval tmp_max_interval (step S1911). The maximal increase interval max_interval and the interval tmp_max_interval will be described later with reference to FIG. 20.

The moving image processing apparatus 100 updates the minimal increase interval min_interval to the interval tmp_min_interval (step S1912). The minimal increase interval min_interval and the interval tmp_min_interval will be described later with reference to FIG. 20.

The moving image processing apparatus 100 determines whether a reference bock rb within the search range is present that has not been selected from the reduced image of the reference image RP (step S1913). If the moving image processing apparatus 100 determines that an unselected reference block rb is present (step S1913: YES), the moving image processing apparatus 100 returns to the operation at step S1902, the moving image processing apparatus 100 selects from the reduced image of the reference image RP, an unselected reference block rb within the search range. On the other hand, if the moving image processing apparatus 100 determines that no unselected reference block rb is present (step S1913: NO), the moving image processing apparatus 100 returns to the operation at the process step at which the moving image processing apparatus 100 invokes the fifth smallest evaluation value calculation process.

Thereby, the candidate vector of the reference block rb corresponding to the smallest evaluation value minSAD can be detected as the first motion vector V1. The maximal increase interval and the minimal increase interval can be recorded when the smallest evaluation value minSAD is calculated.

Details of a process procedure for the fifth evaluation value calculation operation at step S1906 depicted in FIG. 19 will be described.

Figure 20:
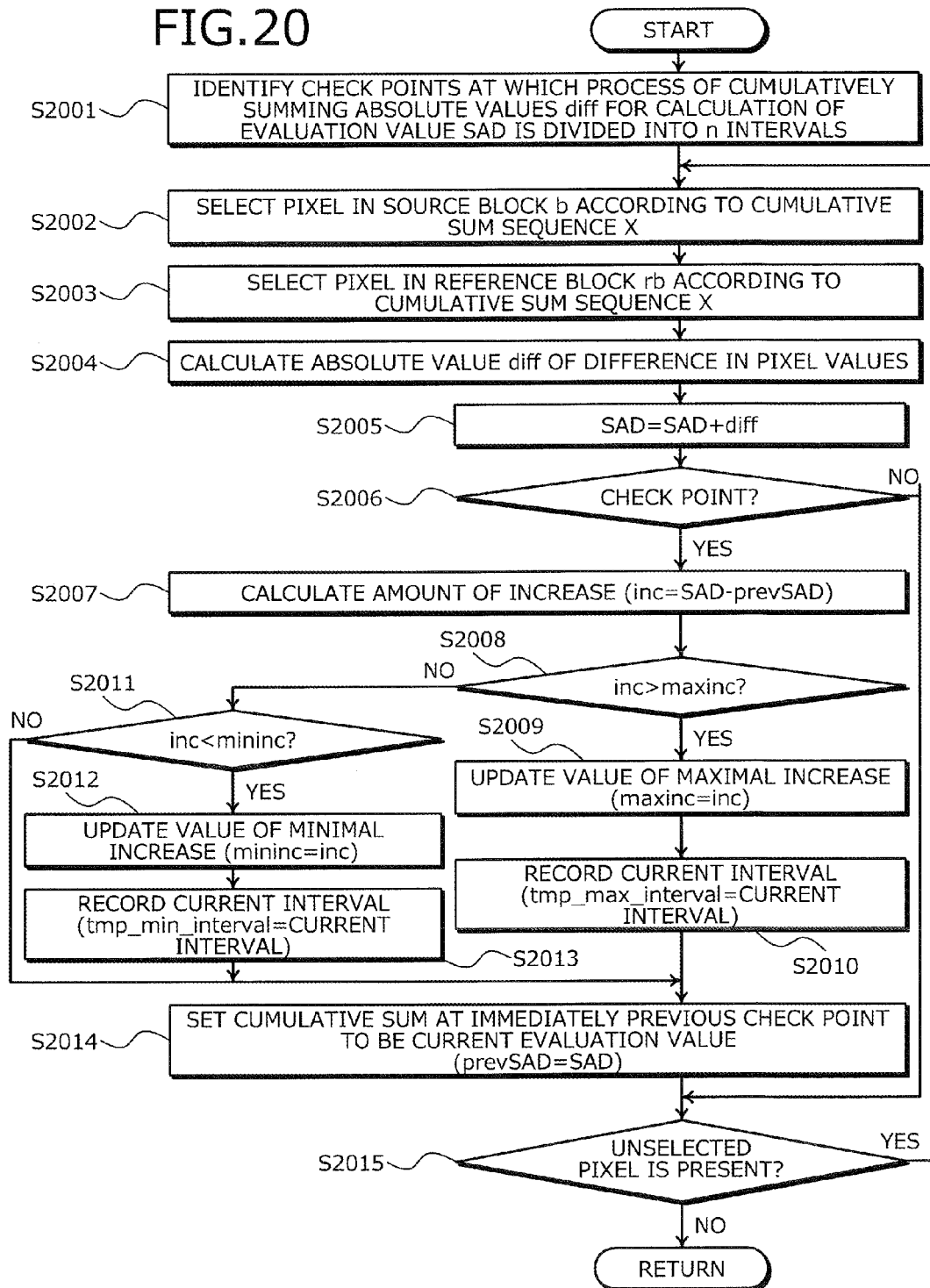
FIG. 20 is a flowchart of an example of details of a procedure for a fifth evaluation value calculation process.

FIG. 20 is a flowchart of an example of details of a procedure for the fifth evaluation value calculation process. In the flowchart of FIG. 20, the moving image processing apparatus 100 identifies the check point at which the process of calculating the cumulative sum of the absolute values diff for the calculation of the evaluation value SAD is divided into n intervals (step S2001).

The moving image processing apparatus 100 selects a pixel in the source block b according to the cumulative sum sequence X (step S2002), and selects a pixel in the reference block rb according to the cumulative sum sequence X (step S2003).

The moving image processing apparatus 100 calculates the absolute value diff of the difference in the pixel value between the selected pixels (step S2004), adds the absolute value diff to the evaluation value SAD (step S2005), and determines whether the current number of process steps is the check point (step S2006).

If the moving image processing apparatus 100 determines that the current number of process steps is not the check point (step S2006: NO), the moving image processing apparatus 100 progresses to the operation at step S2012. On the other hand, if the moving image processing apparatus 100 determines that the current number of process steps is the check point (step S2006: YES), the moving image processing apparatus 100 calculates the amount of increase "inc" by subtracting the current evaluation value prevSAD from the evaluation value SAD (step S2007).

The moving image processing apparatus 100 determines whether the amount of increase "inc" exceeds the value of the maximal increase "maxinc" (step S2008). If the moving image processing apparatus 100 determines that the amount of increase "inc" exceeds the value of the maximal increase "maxinc" (step S2008: YES), the moving image processing apparatus 100 updates the value of the maximal increase "maxinc" to the amount of increase "inc" (step S2009) and records the current interval as the interval tmp_max_interval (step S2010).

If the moving image processing apparatus 100 determines at step S2008 that the amount of increase "inc" less than or equal to the value of the maximal increase "maxinc" (step S2008: NO), the moving image processing apparatus 100 determines whether the amount of increase "inc" is less than the value of the minimal increase "mininc" (step S2011). If the moving image processing apparatus 100 determines that the amount of increase "inc" is greater than or equal to the value of the minimal increase "mininc" (step S2011: NO), the moving image processing apparatus 100 progresses to the operation at step S2014.

On the other hand, if the moving image processing apparatus 100 determines that the amount of increase "inc" is less than the value of the minimal increase "mininc" (step S2011: YES), the moving image processing apparatus 100 updates the value of the minimal increase "mininc" to the amount of increase "inc" (step S2012) and records the current interval as the interval tmp_interval (step S2013).

The moving image processing apparatus 100 sets the cumulative sum at the immediately previous check point to be the current evaluation value "prevSAD" (step S2014) and determines whether an unselected pixel is present that has not been selected from the source block b (step S2015).

If the moving image processing apparatus 100 determines that an unselected pixel is present (step S2015: YES), the moving image processing apparatus 100 returns to the operation at step S2002 and selects an unselected pixel in the source block b. On the other hand, if the moving image processing apparatus 100 determines that no unselected pixel is present (step S2015: NO), the moving image processing apparatus 100 returns to the process step at which the moving image processing apparatus 100 invokes the fifth evaluation value calculation process.

Thereby, the evaluation value SAD can be calculated for each reference block rb and, the maximal increase interval and the minimal increase interval obtained when the evaluation value SAD is calculated can be recorded.

According to the procedures for the first to the fifth determination processes, the smallest evaluation value calculation processes (S604, S904, S1204, S1504, and S1804) are each caused to output the cumulative sum at each of the check points or the interval representing the value of the maximal or the minimal increase and, after the smallest evaluation value calculation processes, the cumulative sum sequence Y in the source block b is determined (S605 to S607, S905 to S907, S1205, S1505, and S1805). On the other hand, the cumulative sum sequence Y determination process may be executed each time the smallest evaluation value is updated (S705, S1005, S1308, S1608, and S1909) and the result of the cumulative sum sequence Y determination process executed last may be employed as the result of the procedure for each of the first to the fifth determination processes. In this case, the storage does not need to be executed for the cumulative sum at each of the check points at the time point at which the smallest evaluation value is updated, or the interval representing the value of the maximal or minimal increase (S707, S1007, S1008, S1310, S1610, S1911, and S1912).

In this case, the determining unit 305 and the comparing unit 311 in FIG. 3 operate each time the smallest evaluation value is updated, based on the result of the calculation of the evaluation value of a reference block rb by the first calculating unit, and determine the cumulative sum sequence Y from the absolute value diff retained by the recording unit 310.

A procedure for the motion detection process of the moving image processing apparatus 100 will be described. The motion detection process is a process of detecting the second motion vector V2 of the source block B in the image OP that corresponds to the source block b.

Figure 21:
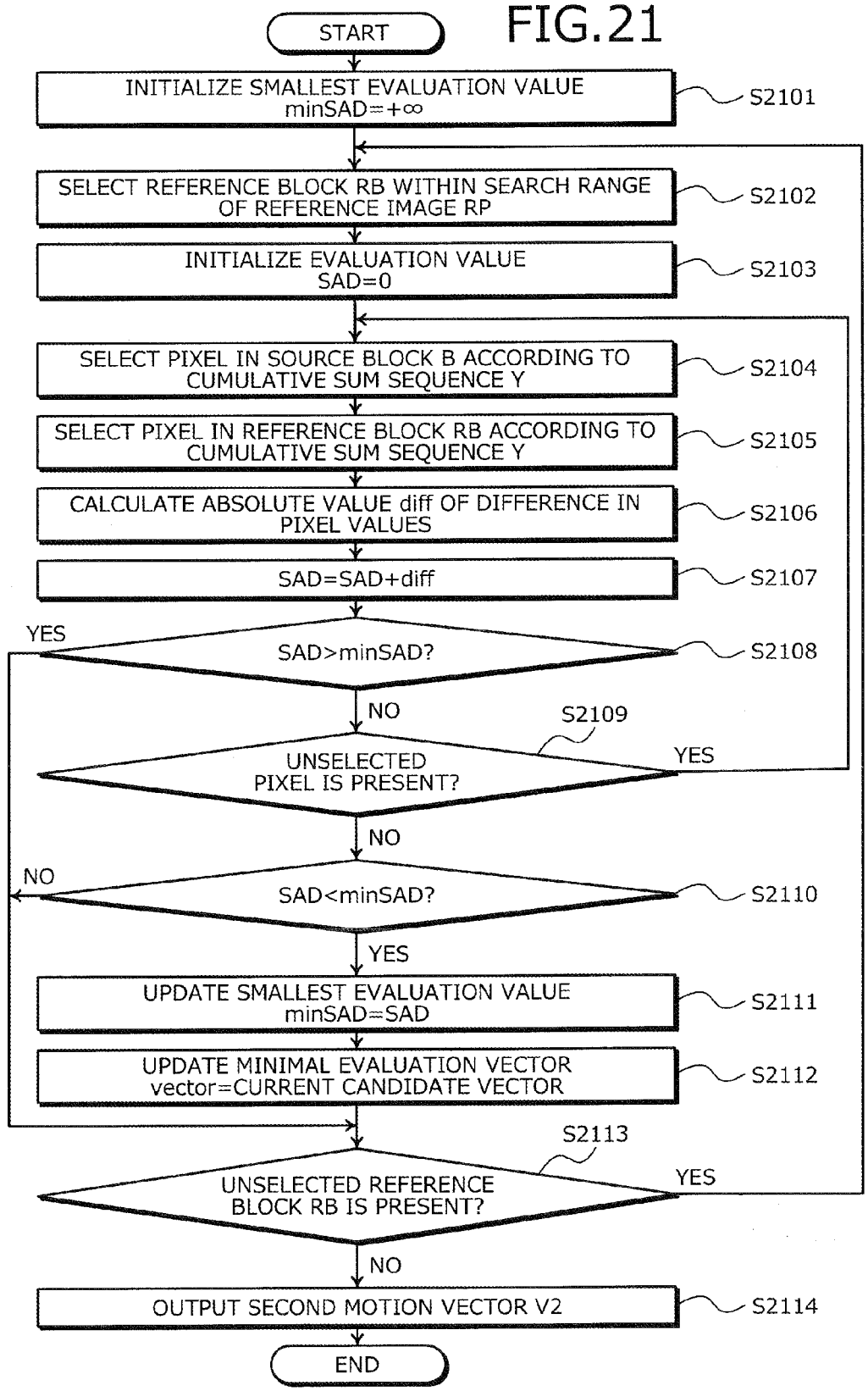
FIG. 21 is a flowchart of an example of a procedure for a motion detection process of the moving image processing apparatus 100.

FIG. 21 is a flowchart of an example of the procedure for the motion detection process of the moving image processing apparatus 100. In the flowchart of FIG. 21, the moving image processing apparatus 100 initializes the smallest evaluation value minSAD with "minSAD=+∞" (step S2101).

The moving image processing apparatus 100 selects the reference block RB within the search range of the reference image RP indicated by the first motion vector V1 (step S2102). The moving image processing apparatus 100 initializes the evaluation value SAD as "SAD=0" (step S2103).

The moving image processing apparatus 100 selects a pixel in the source block B according to the cumulative sum sequence Y indicated by the cumulative sum sequence information corresponding to the source block B (step S2104) and selects a pixel in the reference block RB according to the cumulative sum sequence Y (step S2105).

The moving image processing apparatus 100 calculates the absolute value diff of the difference in the pixel value between the selected pixels (step S2106), adds the absolute value diff to the evaluation value SAD (step S2107), and determines whether the evaluation value SAD of the reference block RB exceeds the smallest evaluation value minSAD (step S2108).

If the moving image processing apparatus 100 determines that the evaluation value SAD of the reference block RB exceeds the smallest evaluation value minSAD (step S2108: YES), the moving image processing apparatus 100 progresses to the operation at step S2113. On the other hand, if the moving image processing apparatus 100 determines that the evaluation value SAD of the reference block RB less than or equal to the smallest evaluation value minSAD (step S2108: NO), the moving image processing apparatus 100 determines whether an unselected pixel is present that has not been selected from the source block B (step S2109).

If the moving image processing apparatus 100 determines that an unselected pixel is present (step S2109: YES), the moving image processing apparatus 100 returns to the operation at step S2104, and selects an unselected pixel in the source block B. On the other hand, if the moving image processing apparatus 100 determines that no unselected pixel is present (step S2109: NO), the moving image processing apparatus 100 determines whether the evaluation value SAD of the reference block RB is less than the smallest evaluation value minSAD (step S2110).

If the moving image processing apparatus 100 determines that the evaluation value SAD of the reference block RB is greater than or equal to the smallest evaluation value minSAD (step S2110: NO), the moving image processing apparatus 100 progresses to the operation at step S2113. On the other hand, if the moving image processing apparatus 100 determines that the evaluation value SAD of the reference block RB is less than the smallest evaluation value minSAD (step S2110: YES), the moving image processing apparatus 100 updates the smallest evaluation value minSAD to the evaluation value SAD of the reference block RB (step S2111).

The moving image processing apparatus 100 updates the minimal evaluation vector "vector" to the current candidate vector (step S2112) and determines whether an unselected reference block RB is present that has not selected within the search range of the reference image RP (step S2113).

If the moving image processing apparatus 100 determines that an unselected reference block RB is present (step S2113: YES), the moving image processing apparatus 100 returns to the operation at step S2103, and selects an unselected reference block RB within the search range of the reference image RP. On the other hand, if the moving image processing apparatus 100 determines that no unselected reference block RB is present (step S2113: NO), the moving image processing apparatus 100 outputs the second motion vector V2 correlating the second motion vector V2 with the source block B (step S2114) and causes the series of process steps according to this flowchart to come to an end. The second motion vector V2 is the minimal evaluation vector "vector".

Thereby, the evaluation value SAD can be calculated for each reference block RB by cumulatively summing the absolute values diff, respectively between corresponding pixels of the source block B and the reference block RB according to the cumulative sum sequence Y by which it is highly likely that the computation of the cumulative sum can be discontinued with a fewer number of process steps.

An example of a configuration will be described for a case where the moving image processing apparatus 100 is applied to a moving image encoding apparatus.

Figure 22:
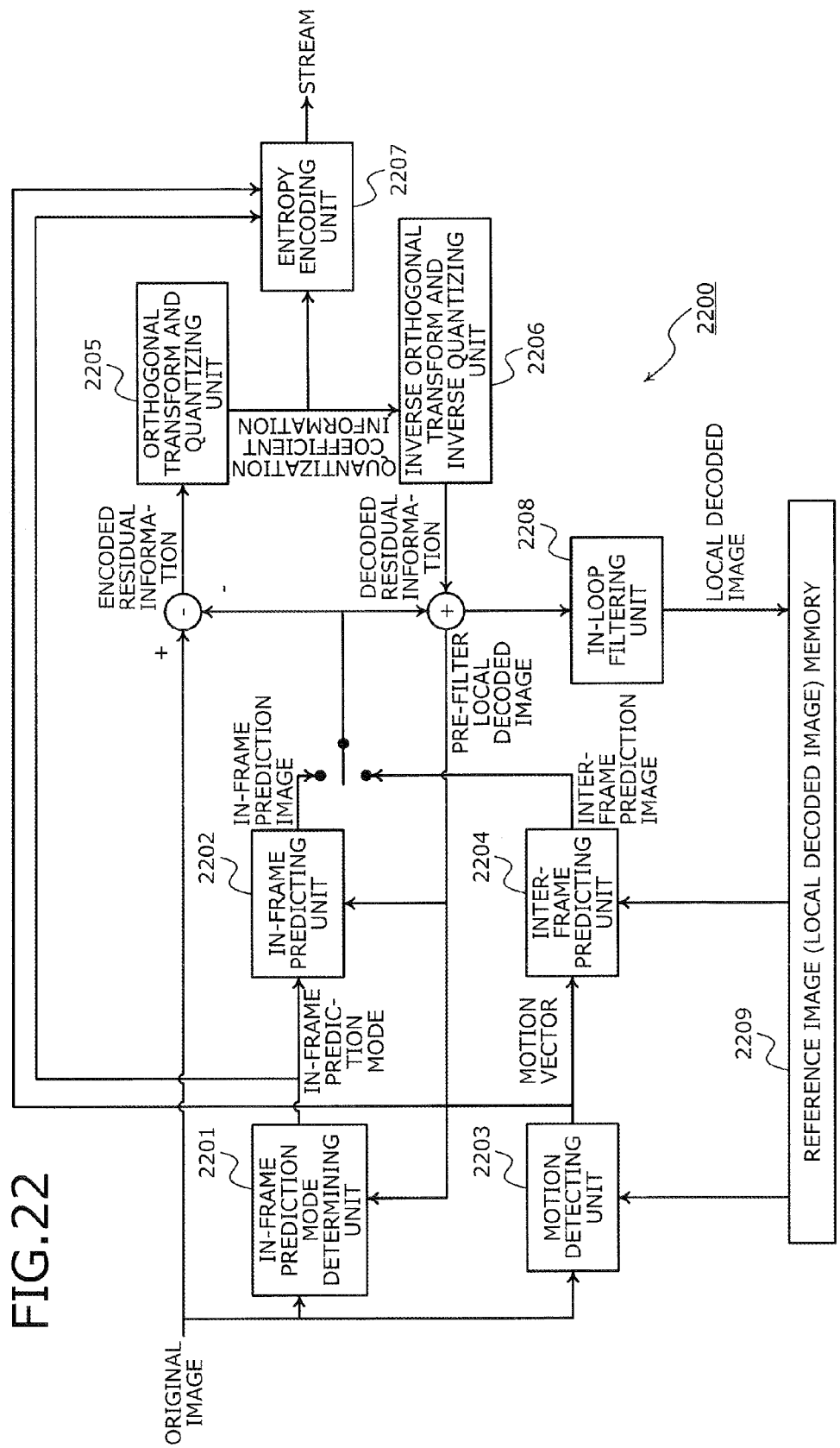
FIG. 22 is a block diagram (Part I) of an example of a configuration of a moving image encoding apparatus.

FIG. 22 is a block diagram (Part I) of an example of a configuration of the moving image encoding apparatus. In FIG. 22, the moving image encoding apparatus 2200 includes an in-frame prediction mode determining unit 2201, an in-frame predicting unit 2202, a motion detecting unit 2203, an inter-frame predicting unit 2204, an orthogonal transform and quantizing unit 2205, an inverse orthogonal transform and inverse quantizing unit 2206, an entropy encoding unit 2207, an in-loop filtering unit 2208, and reference image (local decoded image) memory 2209.

The in-frame prediction mode determining unit 2201 determines a prediction mode of the in-frame prediction. The in-frame predicting unit 2202 executes an in-frame prediction process. The motion detecting unit 2203 detects the motion vector. The motion detecting unit 2203 corresponds to, for example, the units from the input unit 301 to the second detecting unit 306 of the moving image processing apparatus 100, and the motion vector output from the motion detecting unit 2203 corresponds to the second motion vector V2.

The inter-frame predicting unit 2204 executes the inter-frame prediction process based on the motion vector output from the motion detecting unit 2203, and corresponds to, for example, the processing unit 307 of the moving image processing apparatus 100. The orthogonal transform and quantizing unit 2205 executes an orthogonal transform process and a quantization process.

The inverse orthogonal transform and inverse quantizing unit 2206 executes an inverse orthogonal transform process and an inverse quantization process. The entropy encoding unit 2207 produces a stream by executing an entropy encoding process. The in-loop filtering unit 2208 executes a filtering process for a pre-filter local decoded image. The reference image (local decoded image) memory 2209 stores the reference image (local decoded image) that is output from the in-loop filtering unit 2208.

In the example of FIG. 22, description has been made taking an example where the motion detecting unit 2203 executes the first stage and the second stage motion detection processes. However, the component executing the first stage motion detection process and that executing the second stage motion detection process may be provided separately from each other.

Figure 23:
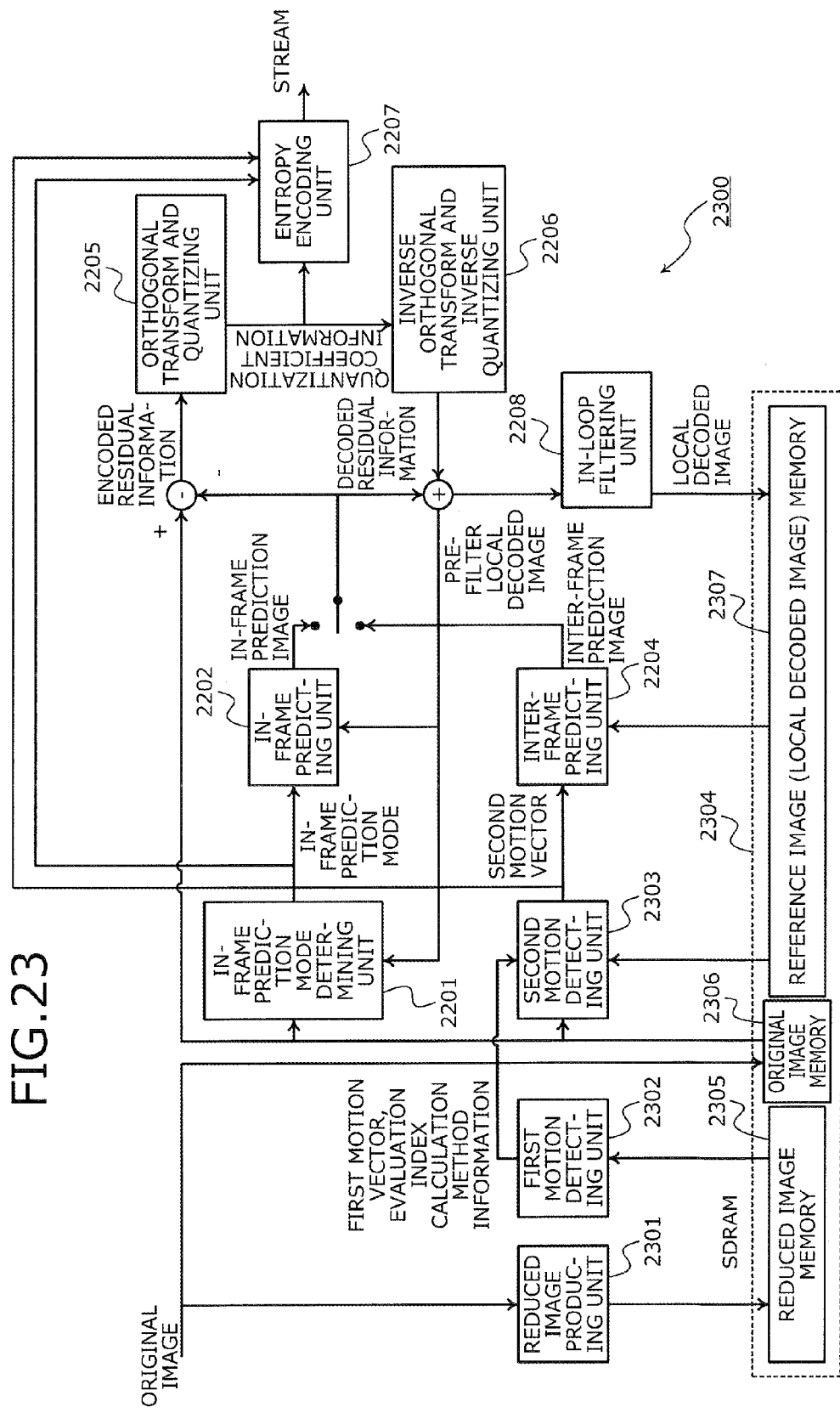
FIG. 23 is a block diagram (Part II) of another example of a configuration of the moving image encoding apparatus.

FIG. 23 is a block diagram (Part II) of another example of a configuration of the moving image encoding apparatus. In FIG. 23, a moving image encoding apparatus 2300 includes the in-frame prediction mode determining unit 2201, the in-frame predicting unit 2202, the inter-frame predicting unit 2204, the orthogonal transform and quantizing unit 2205, the inverse orthogonal transform and inverse quantizing unit 2206, the entropy encoding unit 2207, the in-loop filtering unit 2208, a reduced image producing unit 2301, a first and a second motion detecting units 2302 and 2303, and a synchronous dynamic random access memory (SDRAM) 2304.

The reduced image producing unit 2301 produces the reduced image and corresponds to, for example, the first and the second reducing units 302 and 303 of the moving image processing apparatus 100. The first motion detecting unit 2302 detects the first motion vector and corresponds to, for example, the first detecting unit 304 and the determining unit 305 of the moving image processing apparatus 100. The first motion vector output from the first motion detecting unit 2302 corresponds to the first motion vector V1 and the evaluation index calculation method information output from the first motion detecting unit 2302 corresponds to the cumulative sum information.

The second motion detecting unit 2303 detects the second motion vector and corresponds to, for example, the second detecting unit 306 of the moving image processing apparatus 100. The second motion vector output from the second motion detecting unit 2303 corresponds to the second motion vector V2. The SDRAM 2304 includes reduced image memory 2305, original image memory 2306, and reference image (local decoded image) memory 2307.

The reduced image memory 2305 stores the reduced image that is output from the reduced image producing unit 2301. The original image memory 2306 stores the original image. The original image is, for example, the original image of the image OP. The reference image (local decoded image) memory 2307 stores the reference image (local decoded image) that is output from the in-loop filtering unit 2208.

As described, according to the moving image processing apparatus 100 according to the embodiment, the amounts of increase can be compared among the intervals S1 and S2 formed by dividing into two intervals, the process of calculating the cumulative sum of the absolute values diff in the first stage motion detection process; when the amount of increase in the interval S1 is greater than or equal to that in the interval S2, it can be determined that the cumulative sum sequence Y is the same sequence as the cumulative sum sequence X; and when the amount of increase in the interval S1 is less than that in the interval S2, it can be determined that the cumulative sum sequence Y is the reverse order of the cumulative sum sequence X, thereby enabling output of the cumulative sum sequence Y by which it is highly likely that the computation of the cumulative sum at the second stage motion detection process can be discontinued with a fewer number of process steps than a case where the computation of the cumulative sum is executed according the cumulative sum sequence X.

According to the moving image processing apparatus 100, the amounts of increase can be compared among the intervals S1 and S3, which are formed by dividing into three intervals, the process of calculating the cumulative sum of the absolute values diff in the first stage motion detection process; when the amount of increase in the interval S1 is less than that in the interval S3, it can be determined that the cumulative sum sequence Y is the reverse order of the cumulative sum sequence X; and when the amount of increase in the interval S1 is greater than or equal to that in the interval S3, it can be determined that the cumulative sum sequence Y is the same sequence as the cumulative sum sequence X, thereby enabling output of the cumulative sum sequence Y by which it is highly likely that the computation of the cumulative sum at the second stage motion detection process can be discontinued with a fewer number of process steps than a case where the computation of the cumulative sum is executed according the cumulative sum sequence X.

According to the moving image processing apparatus 100, the amounts of increase can be compared among the intervals S1 to Sn formed by dividing into n intervals, the process of calculating the cumulative sum of the absolute values diff in the first stage motion detection process; and it can be determined that the cumulative sum sequence Y is the sequence to cumulatively sum first the portion corresponding to the maximal increase interval whose value of the increase is the greatest among the intervals S1 to Sn, thereby enabling the output of the cumulative sum sequence Y by which it is highly likely that the computation of the cumulative sum at the second stage motion detection process can be discontinued with a fewer number of process steps than a case where the computation of the cumulative sum is executed according the cumulative sum sequence X.

According to the moving image processing apparatus 100, the amounts of increase can be compared among the intervals S1 to Sn formed by dividing into n intervals, the process of calculating the cumulative sum of the absolute values diff at the first stage motion detection process; and it can be determined that the cumulative sum sequence Y is the sequence to cumulatively sum last the portion corresponding to the minimal increase interval whose value of the increase is the smallest among the intervals S1 to Sn.

According to the moving image processing apparatus 100, the amounts of increase can be compared among the intervals S1 to Sn formed by dividing into n intervals the process of calculating the cumulative sum of the absolute values diff at the first stage motion detection process; and it can be determined that the cumulative sum sequence Y is the sequence to cumulatively sum first the portion corresponding to the maximal increase interval whose value of the increase is the greatest among the intervals S1 to Sn and to cumulatively sum last the portion corresponding to the minimal increase interval whose value of the increase is the smallest. Thereby, the cumulative sum sequence Y can be output, by which it is highly likely that the computation of the cumulative sum in the second stage motion detection process can be discontinued with a fewer number of process steps than a case where the computation of the cumulative sum is executed according the cumulative sum sequence X.

According to the moving image processing apparatus 100, the evaluation value SAD can be calculated for each reference block RB by cumulatively summing according to the cumulative sum sequence Y, the absolute values diff between corresponding pixels in the source block B and the reference block RB at the second stage motion detection process. Thereby, the probability can be increased that the computation of the cumulative sum at the second stage motion detection process can be discontinued with a fewer number of process steps. As a result, the amount of computation necessary for the motion detection can be reduced and thereby, the processing time and the power consumed by the moving image processing apparatus 100 for the motion detection can be reduced.

The description has been made taking an example of motion detection in two stages. However, the moving image processing method may be applied to motion detection in three or more stages. For example, in the motion detection processes at the third stage or thereafter, the moving image processing apparatus 100 may also cumulatively sum the absolute values diff between the pixels according to the cumulative sum sequence Y that is determined at the first stage motion detection process. In a k-th stage motion detection process, the moving image processing apparatus 100 may sequentially determine the cumulative sum sequence Y to be used in a (k+1)th stage motion detection process.

The moving image processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

The moving image processing apparatus 100 described in the present embodiment can be realized by an application specific integrated circuit (ASIC) such as a standard cell or a structured ASIC, or a programmable logic device (PLD) such as a field-programmable gate array (FPGA). Specifically, for example, functional units of the moving image processing apparatus 100 are defined in hardware description language (HDL), which is logically synthesized and applied to the ASIC, the PLD, etc., thereby enabling manufacture of the moving image processing apparatus 100.

According to an aspect of the embodiments, an effect is achieved that the amount of computation necessary for motion detection can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A moving image processing apparatus comprising a processor configured to:
    calculate, by the processor, an evaluation value for each reference block by cumulatively summing in a predetermined sequence, values that each represent a difference between corresponding pixels in a first block that is obtained by dividing an image that is obtained by reducing a given image that is to be processed and a reference block within a search range in an image that is obtained by reducing a reference image;
    record, by the processor, corresponding to an interval formed by partitioning a process of cumulatively summing the values when an evaluation value for the reference block is calculated, an amount of increase of the values in the interval;
    detect, by the processor, a motion vector of the first block, based on a calculation result;
    compare, by the processor, based on contents of a recorded record, the amounts of increase among the intervals of the process of cumulatively summing the values when the evaluation value is calculated for the reference block represented by the detected motion vector; and
    determine, by the processor, based on a comparison result, a cumulative sum sequence that is to be used when the evaluation value of the reference block is calculated by cumulatively summing the values that each represent a difference between corresponding pixels in a second block, which is in the given image and corresponds to the first block, and a reference block that is within a search range in the reference image indicated by the motion vector.

2. The moving image processing apparatus according to claim 1, wherein
    the processor records the amount of increase in at least one interval among a first interval and a second interval formed by partitioning the process into two, the processor compares based on the contents of a recorded record, the amounts of increase in the first and the second intervals of the process of cumulatively summing the values when the evaluation value is calculated of the reference block represented by the motion vector; and the processor determines that the cumulative sum sequence is the same sequence as the predetermined sequence when the amount of increase in the first interval is greater than or equal to the amount of increase in the second interval, and determines that the cumulative sum sequence is a reverse order of the predetermined sequence when the amount of increase in the first interval is less than the amount of increase in the second interval.

3. The moving image processing apparatus according to claim 1, wherein the processor records the amount of increase in at least a first interval and a second interval among the first interval, the second interval, and a third interval formed by partitioning the process into three, the processor compares based on the contents of a recorded record, the amounts of increase in the first and the third intervals of the process of cumulatively summing the values when the evaluation value is calculated of the reference block represented by the motion vector; and the processor determines that the cumulative sum sequence is the same sequence as the predetermined sequence when the amount of increase in the first interval is greater than or equal to the amount of increase in the third interval, and determines that the cumulative sum sequence is a reverse order of the predetermined sequence when the amount of increase in the first interval is less than the amount of increase in the third interval.

4. The moving image processing apparatus according to claim 1, wherein the processor records the amount of increase of each interval formed by partitioning the process, the processor compares based on the contents of a recorded record, the amounts of increase among the intervals of the process of cumulatively summing the values when the evaluation value is calculated of the reference block represented by the motion vector; and the processor determines that the cumulative sum sequence is a sequence to cumulatively sum, first, a value representing a difference between pixels in a portion that corresponds to an interval whose amount of increase is greatest among the intervals.

5. The moving image processing apparatus according to claim 1, wherein the processor records the amount of increase of each interval formed by partitioning the process, the processor compares based on the contents of a recorded record, the amounts of increase among the intervals of the process of cumulatively summing the values when the evaluation value is calculated of the reference block represented by the motion vector; and the processor determines that the cumulative sum sequence is a sequence to cumulatively sum, last, a value representing a difference between pixels in a portion that corresponds to an interval whose amount of increase is smallest among the intervals.

6. The moving image processing apparatus according to claim 1, wherein the processor is further configured to calculate according to the determined cumulative sum sequence, the evaluation value for each reference block by cumulatively summing the values that each represent the difference between the corresponding pixels of the second block and the reference block that is within the search range of the reference image indicated by the motion vector, and detect a motion vector of the second block, based on a calculation result of the evaluation value for each reference block.

7. The moving image processing apparatus according to claim 1, wherein the evaluation value is any one among a sum of absolute differences (SAD), a sum of absolute transformed differences (SATD), and a sum of squared differences (SSD).

8. The moving image processing apparatus according to claim 1, wherein the processor is further configured to produce an interframe prediction image, based on the second block and the reference block that is in the reference image represented by the detected motion vector.

9. The moving image processing apparatus according to claim 1, wherein the processor is further configured to detect an amount of dislocation between the given image and the reference image, based on the detected motion vector.

10. A moving image processing method that is executed by a computer, the moving image processing method comprising:

calculating an evaluation value for each reference block by cumulatively summing in a predetermined sequence, values that each represent a difference between corresponding pixels in a first block that is obtained by dividing an image that is obtained by reducing a given image that is to be processed and a reference block within a search range in an image that is obtained by reducing a reference image;

recording corresponding to an interval formed by partitioning a process of cumulatively summing the values when an evaluation value for the reference block is calculated, an amount of increase of the values in the interval;

detecting a motion vector of the first block, based on a calculation result;

comparing based on contents of a recorded record, the amounts of increase among the intervals of the process of cumulatively summing the values when the evaluation value is calculated for the reference block represented by the detected motion vector; and determining based on a comparison result, a cumulative sum sequence that is to be used when the evaluation value of the reference block is calculated by cumulatively summing the values that each represent a difference between corresponding pixels in a second block, which is in the given image and corresponds to the first block, and a reference block that is within a search range in the reference image indicated by the motion vector.

11. A non-transitory, computer-readable recording medium storing a moving image processing program that causes a computer to execute the moving image processing program comprising:

calculating an evaluation value for each reference block by cumulatively summing in a predetermined sequence, values that each represent a difference between corresponding pixels in a first block that is obtained by dividing an image that is obtained by reducing a given image that is to be processed and a reference block within a search range in an image that is obtained by reducing a reference image;

recording corresponding to an interval formed by partitioning a process of cumulatively summing the values when an evaluation value for the reference block is calculated, an amount of increase of the values in the interval;

detecting a motion vector of the first block, based on a calculation result;

comparing based on contents of a recorded record, the amounts of increase among the intervals of the process of cumulatively summing the values when the evaluation value is calculated for the reference block represented by the detected motion vector; and determining based on a comparison result, a cumulative sum sequence that is to be used when the evaluation value of the reference block is calculated by cumulatively summing the values that each represent a difference between corresponding pixels in a second block, which is in the given image and corresponds to the first block, and a reference block that is within a search range in the reference image indicated by the motion vector.

* * * * *